US012059783B2

(12) United States Patent
Buchanan

(10) Patent No.: US 12,059,783 B2

(45) Date of Patent: Aug. 13, 2024

(54) HAND OPERATED GRIPPING TOOLS

(71) Applicant: Nigel Buchanan, Fife (GB)

(72) Inventor: Nigel Buchanan, Fife (GB)

(73) Assignee: ATE International Ltd, Leicestershire (GB)

( * ) Notice: Subject to any disclaimer, the term of this patent is extended or adjusted under 35 U.S.C. 154(b) by 216 days.

(21) Appl. No.: 17/176,006

(22) Filed: Feb. 15, 2021

(65) Prior Publication Data

US 2021/0276157 A1 Sep. 9, 2021

Related U.S. Application Data

(63) Continuation of application No. 16/083,187, filed as application No. PCT/GB2017/050612 on Mar. 7, 2017, now abandoned.

(30) Foreign Application Priority Data

Mar. 7, 2016 (GB) ...................................... 1603922
Mar. 7, 2016 (GB) ...................................... 1603929

(51) Int. Cl.
*B25B 7/04* (2006.01)
*B25B 7/14* (2006.01)
*B25B 7/16* (2006.01)

(52) U.S. Cl.
CPC .................. *B25B 7/04* (2013.01); *B25B 7/14* (2013.01); *B25B 7/16* (2013.01)

(58) Field of Classification Search
CPC .. B25B 7/123; B25B 7/02; B25B 7/04; B25B 7/10; B25B 7/12; B25B 7/14; B25B 5/06; B25B 5/068; B25B 5/12; B25B 5/127; B25B 13/22; B25B 13/12; B25B 13/5058; B25B 13/46; B25B 13/14; B25B 13/16; B25B 7/16; B25G 1/005; B25G 1/10
See application file for complete search history.

(56) References Cited

U.S. PATENT DOCUMENTS

| | | | | |
|---|---|---|---|---|
| 1,119,791 A | 12/1914 | Baldwin | | |
| 2,084,633 A * | 6/1937 | Erickson | B25B 7/12 | 81/391 |
| 5,542,167 A * | 8/1996 | Nakamoto | B25B 7/04 | 81/424 |
| 6,336,387 B1 * | 1/2002 | Lee | B25B 7/00 | 81/416 |

(Continued)

FOREIGN PATENT DOCUMENTS

| | | |
|---|---|---|
| DE | 10129131 A1 | 12/2002 |
| WO | 2015009755 A1 | 1/2015 |

OTHER PUBLICATIONS

International Search and Written Opinion for corresponding PCT/GB2017/050612, dated Oct. 13, 2017, 17 pages.

*Primary Examiner* — Robert J Scruggs
(74) *Attorney, Agent, or Firm* — Patterson Intellectual Property Law, PC; Emily A. Shouse

(57) ABSTRACT

A hand operated gripping tool has a first handle (301), a first jaw (201) connected with the first handle, a second handle (302) pivotably connected with the first handle to permit relative pivoting movement of the second handle with respect to the first handle and a second jaw (202) connected with the second handle. One of the first jaw and second jaw is a removable jaw and the removable jaw is push-fit attachable to the respective handle.

4 Claims, 18 Drawing Sheets

(56) References Cited

U.S. PATENT DOCUMENTS

| | | | | |
|---|---|---|---|---|
| 7,055,413 | B1 * | 6/2006 | Wang | B25B 7/04 29/229 |
| 2004/0089117 | A1 * | 5/2004 | Hsien | B25B 7/00 81/424 |

* cited by examiner

HAND OPERATED GRIPPING TOOLS

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: U.S. Ser. No. 16/083,187 filed Sep. 7, 2018; PCT/GB2017/050612 filed Mar. 7, 2017; GB1603929.9 filed Mar. 7, 2016; and GB 1603922.4 filed Mar. 7, 2016.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The invention relates to hand operated gripping tools gripping tools that are adjustable within the range of the jaws of the tool. One form of hand operated gripping tool is pliers of the type generally referred to as pliers or vice grip pliers as they are commonly known.

Existing locking pliers such as US2015283681, US2015273664 comprise two robust handles connected to two robust jaws, and a locking mechanism connected to the two jaws. The handles can be squeezed to close the jaws. The locking member is attached to an over centre linkage which when utilized prevents the lower handle from pivoting from its closed configuration and until opened retaining the jaws in a closed position. The clamping width of the jaws is adjusted by an adjustment screw, the adjustment screw further determining the clamping pressure exerted upon the clamped workpiece. As the clamping pressure has to be pre-set it can take several attempts to correctly adjust the screw to the required position in order to clamp the workpiece the best way. The clamping width of the jaws once set by the adjusting screw is finite, any movement, vibration or relaxing of the clamped material normally results in the failure of the clamping action. This is most prevalent when the device is used to initially clamp bodywork parts during a panel beating process prior to welding or bolting the panels being worked on. Inadvertent over pressure applied by the clamping jaws usually results in damage or distortion of the clamped parts.

USD742194 shows a set of pliers having a toothed strut with a locking mechanism attached to one operating arm. As the arms are closed the teeth "ratchet" past the lock. As the operating arms are not designed to resiliently deform during robust operation, the toothed arc of the strut remains in substantially the same locking angle relative to the locking mechanism.

EP2818280 comprises pliers or clamps having a bow or arcuate portion to permit limited flexing of one of the handles. A pivotal strut is retained between the handles and the strut is slidably held in a channel within one handle and pivotally held within the other handle. The pivotal end of the strut has a toothed arc, which acts with a switched pawl to lock or unlock the handle positions relative to one another. Compression of the handles closes the gap between the fixed and moveable jaws, the moveable jaw sliding up a clamp bar portion until the jaws robustly contact the workpiece, the further operation of the handles resulting in the clamping of the workpiece, the resilient arcuate portion acting to impose a limited sprung grip upon the workpiece, further usefulness imported by the locking action of the pawl teeth within the strut arc teeth when the pawl is switched into its ratchet locking position retaining the handles substantially in their closed position providing a limited spring grip upon the workpiece. The arc of the toothed strut in conjunction with the corresponding toothed arc of the pawl being capable of compensating for the changes in angles of one handle relative to the other as the resilient portion flexes as differing pressures are applied to the handles during use, any normal locking switch being rendered suspect as the angle of one locking tooth to the other changing as the handle flexes, which may prevent the teeth interlocking sufficiently to provide a dependable locking mechanism.

The present invention incorporates clamping widths within its specification that are automatically adjusted, the locking pressure can be further be usefully determined by the operator by the straightforward gripping pressure of the handles, the simple release of the handles initiating the locking of the jaws upon the clamped parts. The utilization of bowed resilient portions within the handle or handles providing superior constant jaw clamping pressure of the part or parts clamped whilst normally preventing surface damage to the parts clamed. The present invention further works on a reasonable range of workpiece sizes and shapes whilst utilizing superior sprung gripping force of the workpiece. Furthermore, the main parts are capable of being stamped in order to further reduce their cost.

It is an object of the invention to at least partially alleviate one or more of the above-mentioned disadvantages or to provide an alternative to existing products.

BRIEF SUMMARY OF THE INVENTION

The invention provides a hand operated gripping tool comprising a first handle, a first jaw connected with said first handle, a second handle pivotably connected with said first handle to permit relative pivoting movement of said first and second handles and a second jaw connected with said second handle, wherein one of said first jaw and second jaw is a removable jaw and said removable jaw is push-fit attachable to the respective said handle.

In some examples said removable jaw comprises an outboard portion defining a gripping region and an inboard portion that projects from said outboard portion and is received the respective said handle.

In some examples said inboard portion comprises first part and a second part disposed opposite said first part to define a slot between said parts, said respective handle defines respective recesses to receive said first and second part and said recesses define a blade that complementary engages in said slot when said removable jaw is push-fit attached to said respective handle.

In some examples said blade comprises a leading end provided with a plurality of formations that complementarily engage a plurality for formations defined by said removable jaw to define a plurality of selectable orientations of said removable jaw with respect to the respective said handle.

Some examples further comprise a locking mechanism by which said removable jaw is lockable to the respective said jaw.

In some examples said locking mechanism comprises a snap-fit mechanism.

In some examples said snap-fit mechanism comprises a detent mechanism.

In some examples said locking mechanism comprises a rotatable switch carried by the respective said handle and removable jaw comprises a recess engageable by said rotatable switch to lock said removable jaw to the said respective handle.

In some examples each of said movable and first jaws is a said removable jaw.

The invention also includes a hand operated gripping tool comprising a first handle, a first jaw connected with said first handle, a second handle pivotably connected with said first handle to permit relative pivoting movement of said first and second handles, a second jaw connected with said second handle, a strut having first end pivotally attached to said second handle, a locking switch pivotally attached to said first handle and a biasing member acting on said locking switch, wherein said locking switch has at least one tooth engageable with teeth provided on said strut, said biasing member biases said locking switch towards said strut so that said at least one tooth engages said strut and slides over said teeth on said strut when, in use, said first and second handles move towards one another.

In some examples said teeth on said strut are provided on a first side of said strut, said strut has a second side disposed opposite said first side and said first handle defines a bearing surface engaging said second side to control pivoting movement of said strut when, in use, said whereby the relative orientation of said locking switch and strut is maintained during said movement of said first and second handles towards one another.

In some examples said locking switch further comprises a guide face and said guide face is configured such that pivotal movement of said locking switch by a user applied force to release said at least one tooth from engagement with said teeth on said strut causes said guide face to engage said strut to cooperate with said bearing surface to define a channel through which said strut slides guided by said bearing surface and guide face when, in use, said first and second handles move away from one another.

In some examples said biasing member comprises a first portion engaging said locking switch and a second portion engaging said first handle and third portion engaging said second handle whereby said biasing member biases said locking switch and biases said second handle away from said first handle.

In some examples at least one of said first and second handles comprises a flexure portion configured to allow flexing of the respective handle in response to a force applied by a user to move said first and second handles towards one another when movement of said second jaw towards said first jaw is prevented by a workpiece held between said jaws whereby said at least one tooth engaged with said teeth on said strut can be moved at least one strut tooth closer to said first end.

In some examples one of said first jaw and second. jaw is a removable jaw and said removable jaw is push-fit attachable to the respective said handle.

The invention also includes a hand operated gripping tool comprising a first handle, a first jaw connected with said first handle, a second handle pivotably connected with said first handle to permit relative pivoting movement of said first and second handles, a second jaw connected with said second handle, a strut having first end pivotally attached to said second handle, a locking switch pivotally attached to said first handle and a biasing member, wherein said biasing member comprises a spring extending between said first and second handles to bias said first and second handles away from one another, said strut extends within said spring and said spring engages said locking switch to bias said locking switch towards said strut.

In some examples said locking switch has at least one tooth engageable with teeth provided on said strut, said biasing member biases said locking switch towards said strut so that said at least one tooth engages said strut and slides over said teeth on said strut when, in use, said first and second handles move towards one another.

In some examples one of said first jaw and said second jaw is a removable jaw and said removable jaw is push-fit attachable to the respective said handle.

The invention also includes a hand operated gripping tool comprising a first handle, a first jaw connected with said first handle, a second handle pivotably connected with said first handle to permit relative pivoting movement of said first and second handles, a second jaw connected with said second handle, a strut having first end pivotally attached to said second handle, a locking switch pivotally attached to said first handle and having at least one tooth engageable with teeth provided on said strut and biasing member biases that said locking switch towards said strut, wherein each said handle comprises a flexure portion configured to allow flexing of the respective handle in response to a force applied by a user to move said first and second handles towards one another when movement of said second jaw towards said first jaw is prevented by a workpiece held between said jaws whereby said at least one tooth engaged with said teeth on said strut can be moved at least one strut tooth closer to said first end.

In some examples each said flexure portion is defined by an arch portion disposed intermediate said strut and said first and second handles.

In some examples said arch portions arch in opposite directions and are disposed in opposed spaced apart relationship.

BRIEF DESCRIPTION OF THE SEVERAL VIEWS OF THE DRAWINGS

In order that the invention may be well understood some examples will now be described with reference to the drawings, in which.

REFERENCE TO THE DRAWINGS

Figure 1:
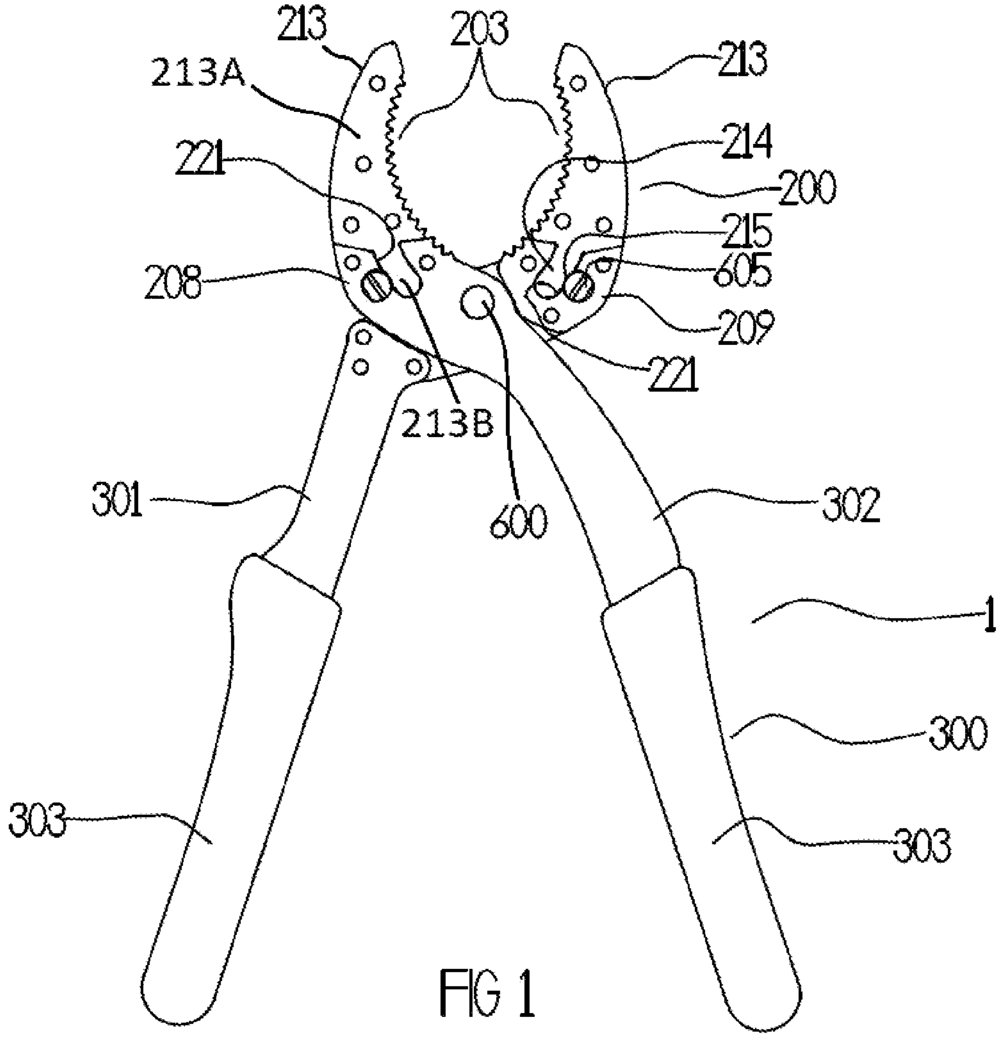
FIG. 1 is a front plan view of Multi Jaw Pliers.

Following is a listing of the various components used in the best mode preferred embodiment and alternative embodiments. For the ready reference of the reader the reference numerals have been arranged in ascending numerical order.

| | | | |
|---|---|---|---|
| 1 | Multi Jaw Pliers | 218 | Lower Jaw Web |
| 200 | Head Portion | 219 | Detachable Jaw Assembly Holes |
| 201 | First Jaw | 220 | Lower Jaw Abutment Faces |
| 202 | Second Jaw | 221 | Detachable Jaw Recess |
| 203 | Gripping Face | 222 | Detachable Jaw Inner Plate |
| 204 | Assembly Holes | 223 | Detachable Jaw Outer Plate |
| | | 224 | Detachable Jaw Engagement Teeth |
| 206 | Moving Jaw Outer Plate | 225 | Lower Jaw Engagement Teeth |
| 207 | Jaw Pivot Bore | 226 | Lower Jaw Movement Slot |
| 208 | First Lower Jaw | 227 | Detachable Jaw Screw Hole |
| 209 | Second Lower Jaw | 228 | Detachable Jaw Threaded Hole |
| 210 | Lower Jaw Inner Plate | 229 | Detachable Jaw Resilient Portions |
| 211 | Lower Jaw Outer Plate | 230 | Swivel Lock Detachable Jaw |
| 212 | Lower Jaw Engagement Slot | | |
| 213 | Detachable Jaw | | |
| 214 | Interlocking Tongue | | |
| 215 | Interlocking Tongue Recess | | |
| 216 | Detachable Jaw Abutment Faces | | |
| 217 | Detachable Jaw Swivable Gripping Portion | | |
| 300 | Handle Portion | 309 | First Handle Outer Plates |
| 301 | First Handle | 311 | First Handle Inner Plates |
| 302 | Second Handle | 313 | Grip Covers |
| 303 | Handle Clenching Grips | 314 | Second Handle Outer Plates |
| 304 | Handle Resilient Portions | 315 | Second Handle Inner Plates |
| 305 | Handle Internal Spacers | 316 | Strut Spring Face |
| 306 | Handle Assembly Holes | | |
| 307 | Strut Pivot Pin Holes | | |
| 308 | Switch Pivot Pin Holes | | |
| 400 | Pivotal Strut | 404 | Strut Pivot Pin Hole |
| 401 | Strut Toothed Face | 405 | Strut Outer End |
| 402 | Strut Teeth | 406 | Strut Stop |
| 403 | Strut Back Face | 409 | Strut Pivotal End |
| 500 | Pivotal Switch | 514 | Toothed Wheel Switch |
| 501 | Pivotal Actuator | 515 | Toothed Wheel |
| 502 | Actuator Pivot Hole | 516 | Toothed Wheel Axle |
| 503 | Smooth Guide Portion | 517 | Actuator |
| 504 | Spring Operating Face | 518 | Actuator Positional Arc |
| 505 | Toggle Lever | 519 | Positional Arc Locking Teeth |
| 506 | Locking Teeth | 520 | Positional Arc Unlocking Surface |
| 507 | Locking Stop | 521 | Actuator Spring Hole |
| 508 | Pivotal Switch Housing | 522 | Toothed Wheel Switch Housing |
| 509 | Housing Guide Block Face | 523 | Toothed Wheel Switch Housing Spring Hole |
| 510 | Housing Channel | 524 | Toothed Wheel Switch Housing Elongate Slots |
| 511 | Housing Spring Alignment Projection | | |
| 600 | Jaw Pivot Pin | 70 | Strut Spring |
| 601 | Switch Pivot Pin | 71 | Strut Spring Ends |
| 603 | Strut Axle Pin | 72 | Switch Spring |
| 604 | Fixings | | |
| 605 | Jaw Locking Pin | 80 | Workpiece |
| 606 | Locking Pin Control Axle | | |
| 607 | Locking Pin Outer Axle | C | Clenching Force |
| 608 | Locking Pin Operating Slot | G | Gripping Force |
| 609 | Locking Pin Locking Face | | |
| 610 | Locking Pin Unlocking Face | | |
| 611 | Locking Pin Outer Face | | |
| 612 | Locking Pin Threaded Bore | | |
| 613 | Locking Pin Operating Screw | | |
| 614 | Jaw Locking Screw | | |
| 615 | Spacers | | |

DETAILED DESCRIPTION OF THE INVENTION

Figure 2:
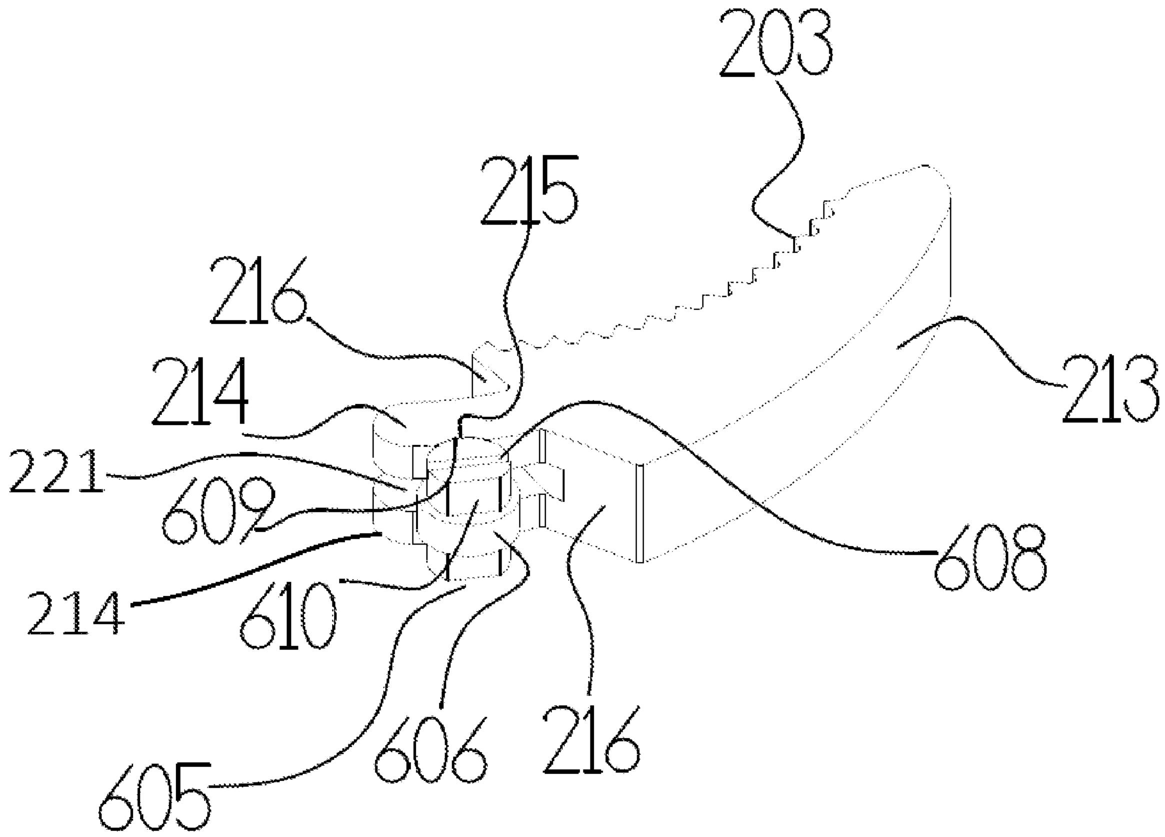
FIG. 2 is a perspective view of a detached jaw of the Multi Jaw Pliers.

FIGS. 1 and 2 shows a hand operated gripping tool or, Multi Jaw Pliers, 1 comprising a handle portion 300 that has a first handle 301, a second handle 302 and handle clenching grips 303. The hand operated gripping tool further comprises a head portion 200 comprising detachable jaws 213 that have a first part (first interlocking tongue 214) second part (second interlocking tongue 214), a first lower jaw 208, a second lower jaw 209, a jaw locking pin 605 and a jaw pivot pin 600.

FIG. 2 illustrates the detachable jaw 213 comprising a gripping face 203, the first and second interlocking tongues 214, an interlocking tongue recess 215, detachable jaw abutment faces 216 (FIG. 3), a detachable jaw recess, or slot, 221 defined between the first and second interlocking tongues 214, a jaw locking pin 605, a jaw locking pin control axle 606, a locking pin operating face 608, a jaw locking pin locking face 609 and a locking pin unlocking face 610. As shown in FIGS. 1 and 2, the detachable jaws 213 have an outboard portion 213A and an inboard portion 213B. When the detachable jaws 213 are attached to a respective handle 301, 302, the outboard portion 213A projects from the handle and the inboard portion 213B is received by, or overlaps, the handle. The jaw locking pin 605 and interlocking tongue recess 215 function as a locking mechanism by which the detachable jaw 213 is secured to the respective handle. The jaw locking pin 605 acts as a rotatable switch that can be switched between a locking condition and an unlocking condition by rotation between a position in which the jaw pin locking face 609 engages in the interlocking tongue recess 215 and a position in which the locking pin unlocking face 610 faces the interlocking tongue recess. The locking condition is shown in FIG. 1 and the position that provides the unlocking condition is shown in FIG. 4.

Figure 3:
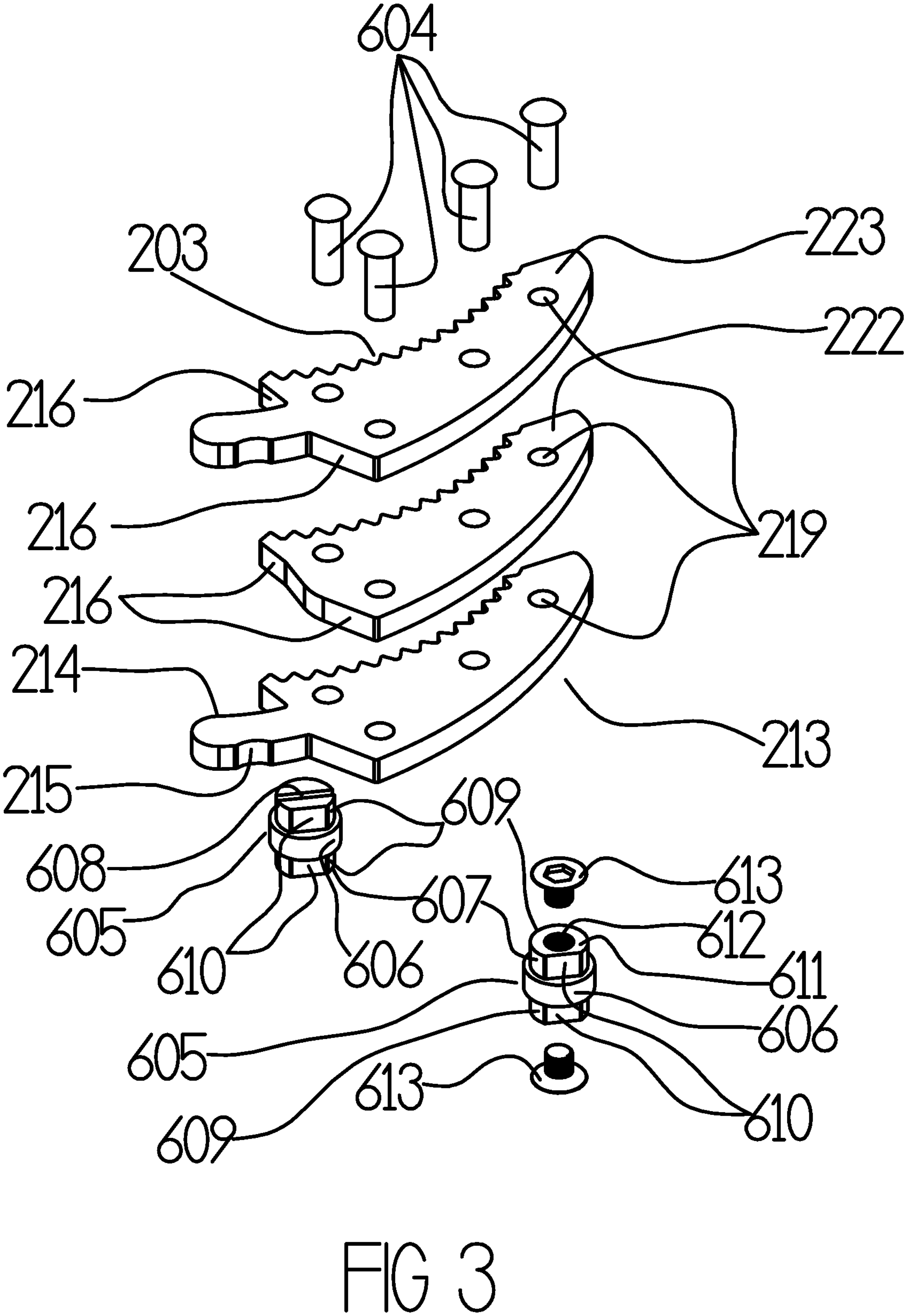
FIG. 3 is a perspective view of a detached jaw of the Multi Jaw Pliers the parts shown dismantled for display purposes.

FIG. 3 shows the dismantled detachable jaw 213, comprising outer plates 223, an inner plate 222, said gripping faces 203, said interlocking tongues 214, with said interlocking tongue recesses 215, said detachable jaw abutment faces 216, fixing holes 219, for said fixings 604, said jaw locking pin 605 with said control axle 606, said outer axle 607, said operating slot 608, said locking face 609, said unlocking face 610, said outer face 611 and alternately a said threaded bore 612 and said locking screw 613.

Figure 4:
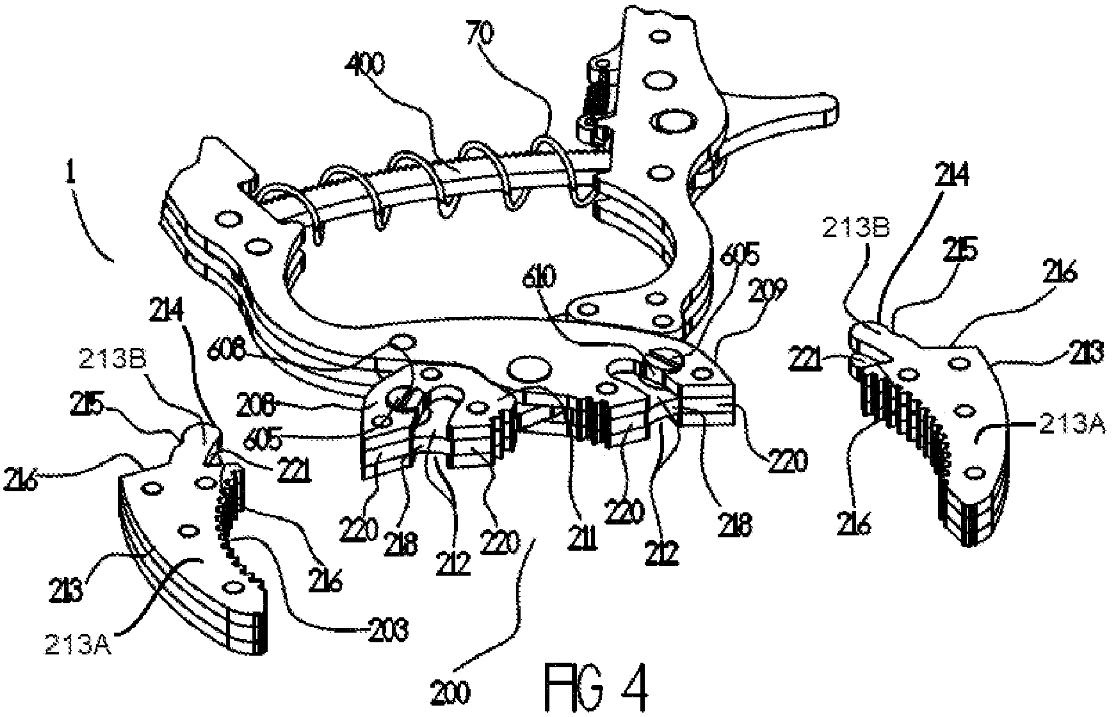
FIG. 4 is a perspective view of the head portion of the Multi Jaw Pliers the jaws shown separated.

FIG. 4 illustrates the jaw portion 200 comprising the gripping faces 203, a first lower jaw 208, a second lower jaw 209, an inner plate 210 sandwiched between outer plates 211, recesses 212 defined in the outer plates 211, said detachable jaw 213, said interlocking tongues 214, said recess 215, said abutment faces 216, said lower jaw abutment faces 220, said jaw locking pin 605, said operating slot 608 and said unlocking face 610. The recesses 212 in the outer plates 211 expose a portion of the inner plate 210 to define a blade, or lower jaw web, 218.

Figure 5:
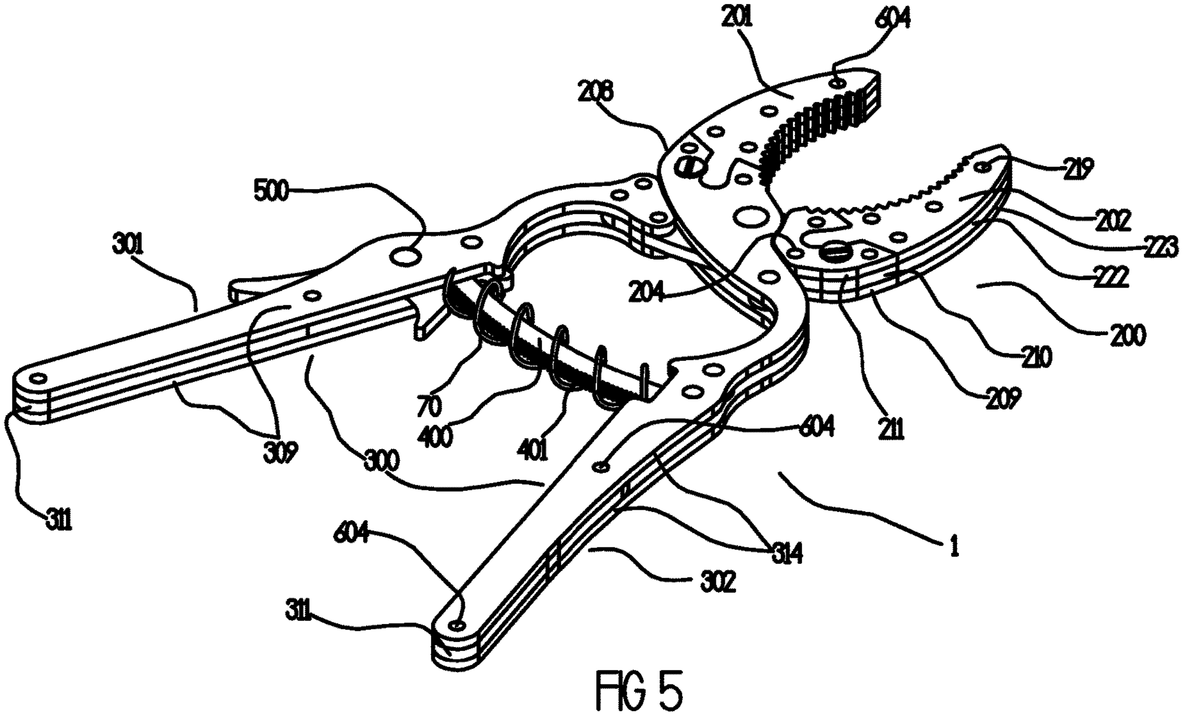
FIG. 5 is a perspective view of the Multi Jaw Pliers.

FIG. 5 shows the said Pliers 1, said jaw portion 200 comprising said first jaw 201, said second jaw 202, said lower first jaw 208, said lower second jaw 209, said inner plate 210, said outer plate 211, said assembly holes 204, said detachable jaw 213 further comprising said inner plate 222, said outer plate 223 and said assembly holes 219 with said fixings 604.

Handle portion 300 comprising said first handle 301, said inner plate 311, said outer plates 309, said second handle 302, said inner plate 315, said outer plates 314, said assembly holes 306 with said fixings 604, said pivotal strut 400 comprising said pivotal strut.

Figure 6:
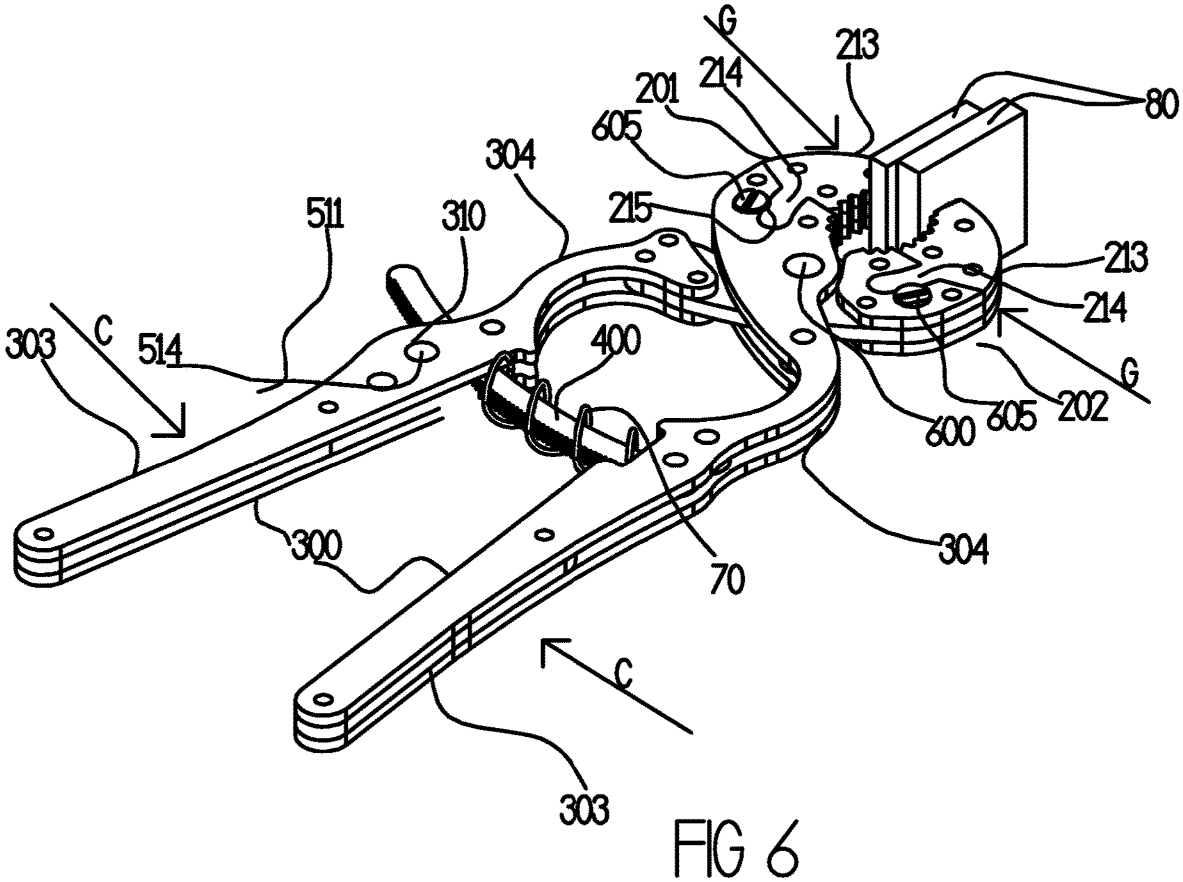
FIG. 6 is a front plan view of the Multi Jaw Pliers clamped on a workpiece.

FIG. 6 illustrates the said Pliers 1 comprising said Multi Jaw Pliers 1, said first jaw 201, said second jaw 202, said detachable jaw 213, said interlocking tongue 214, said interlocking tongue recess 215, said handle portion 300, said handle clenching grips 303, said handle bend promoting portions 304, said pivotal strut 400, said housing spring alignment projection 511, said toothed wheel switch 514, said jaw pivot pin 600, said jaw locking pin 605, said strut spring 70, said workpiece 80, said clenching force C.

Figure 7:
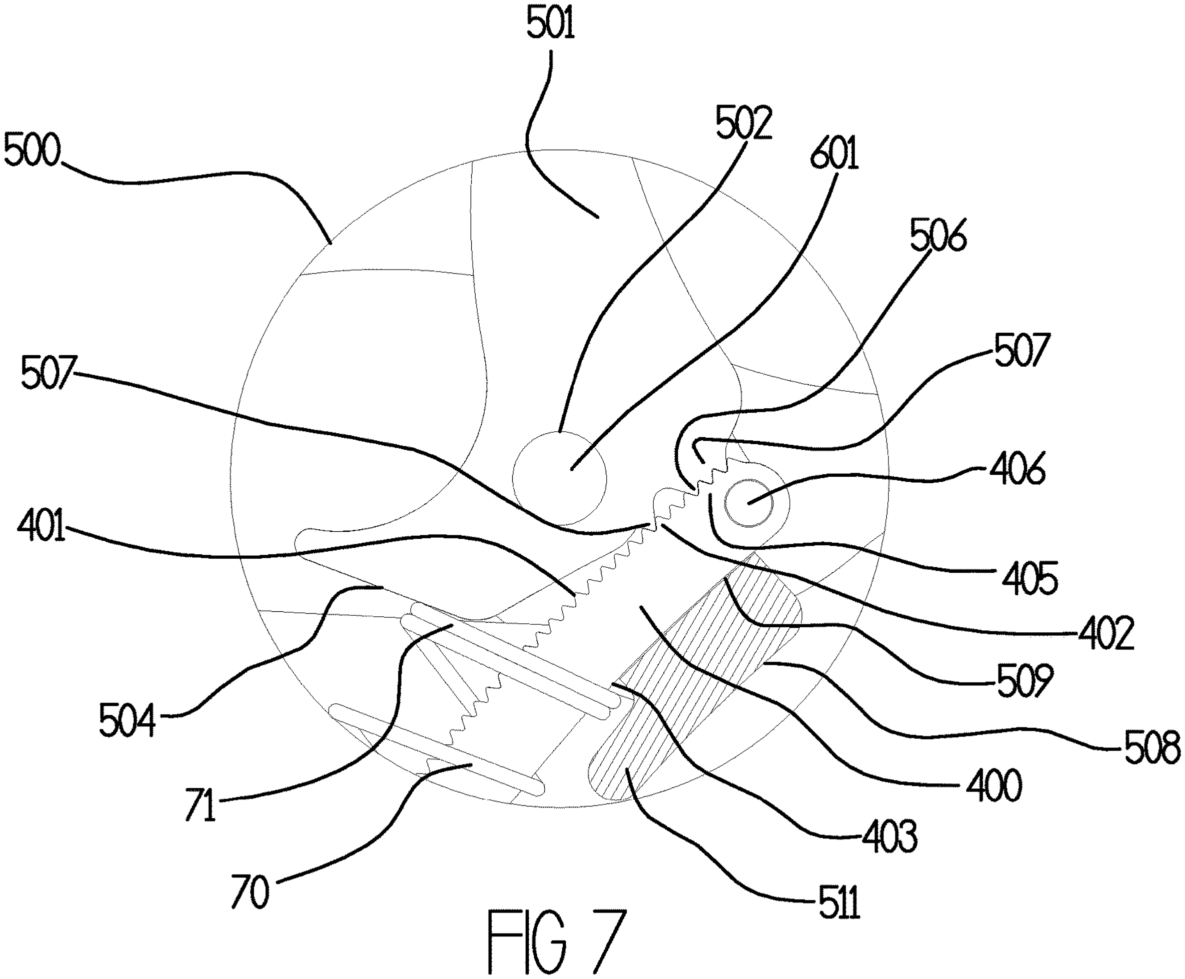
FIG. 7 is a close up plan view of the pivotal switch in the closed position.

FIG. 7 shows the said pivotal switch 500 comprising said pivotal strut 400, said strut toothed face 401, said strut teeth 402, said strut back face 403, said strut outer end 405, said pivotal switch 500, said pivotal actuator 501, said actuator pivot hole 502, said spring operating face 504, said locking teeth 506, said locking stop 507, said housing guide block face 509, said housing spring alignment projection 511, said actuator 517, said switch pivot pin 601, said strut spring 70, said strut spring ends 71.

Figure 8:
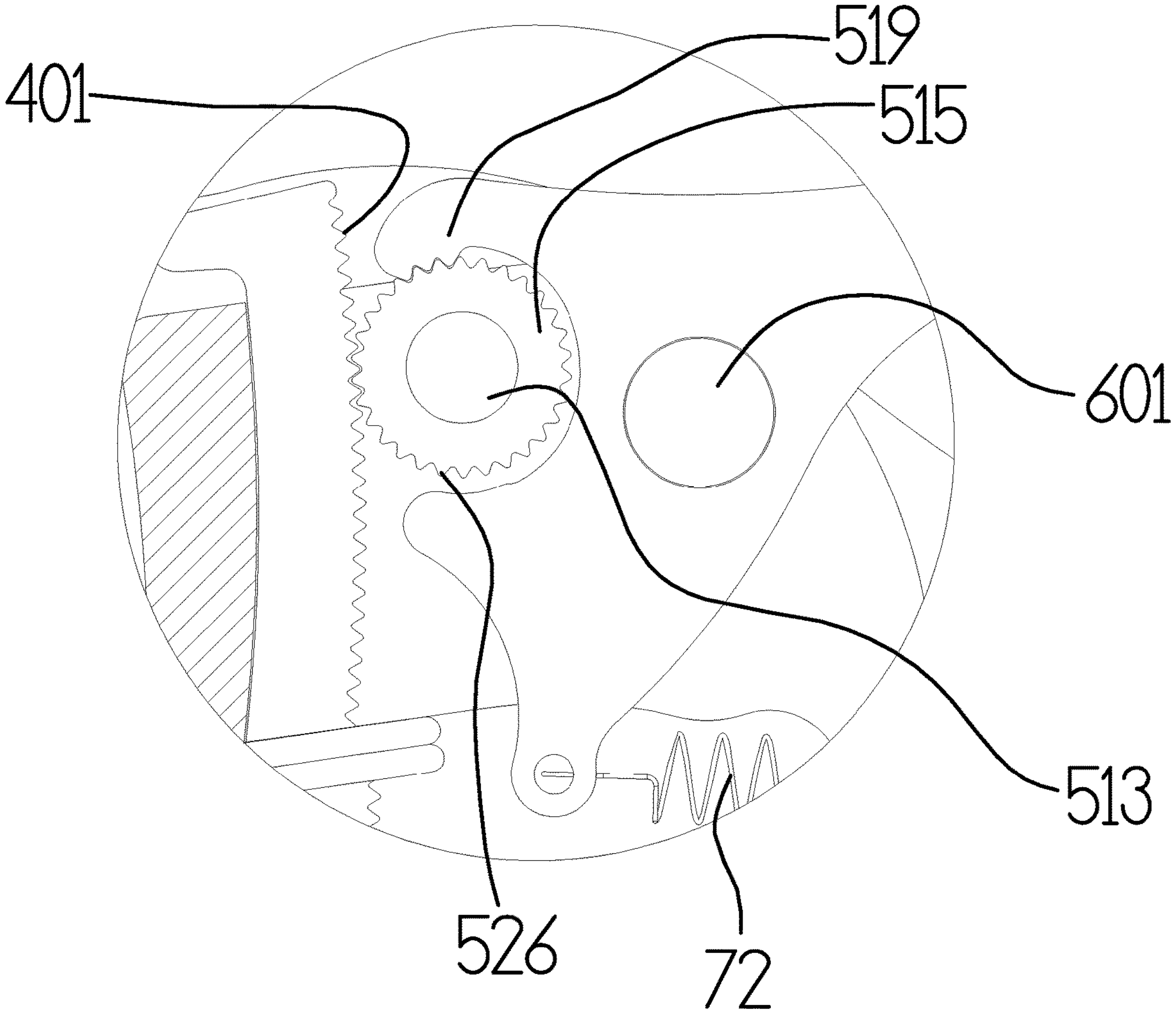
FIG. 8 is a close up plan view of the toothed wheel switch in the closed position.

FIG. 8 illustrates the said toothed wheel switch 514 comprising said strut toothed face 401, said toothed wheel 515, said positional arc locking teeth 519, said toothed wheel axle 526, said switch pivot pin 601, said switch spring 72.

Figure 9:
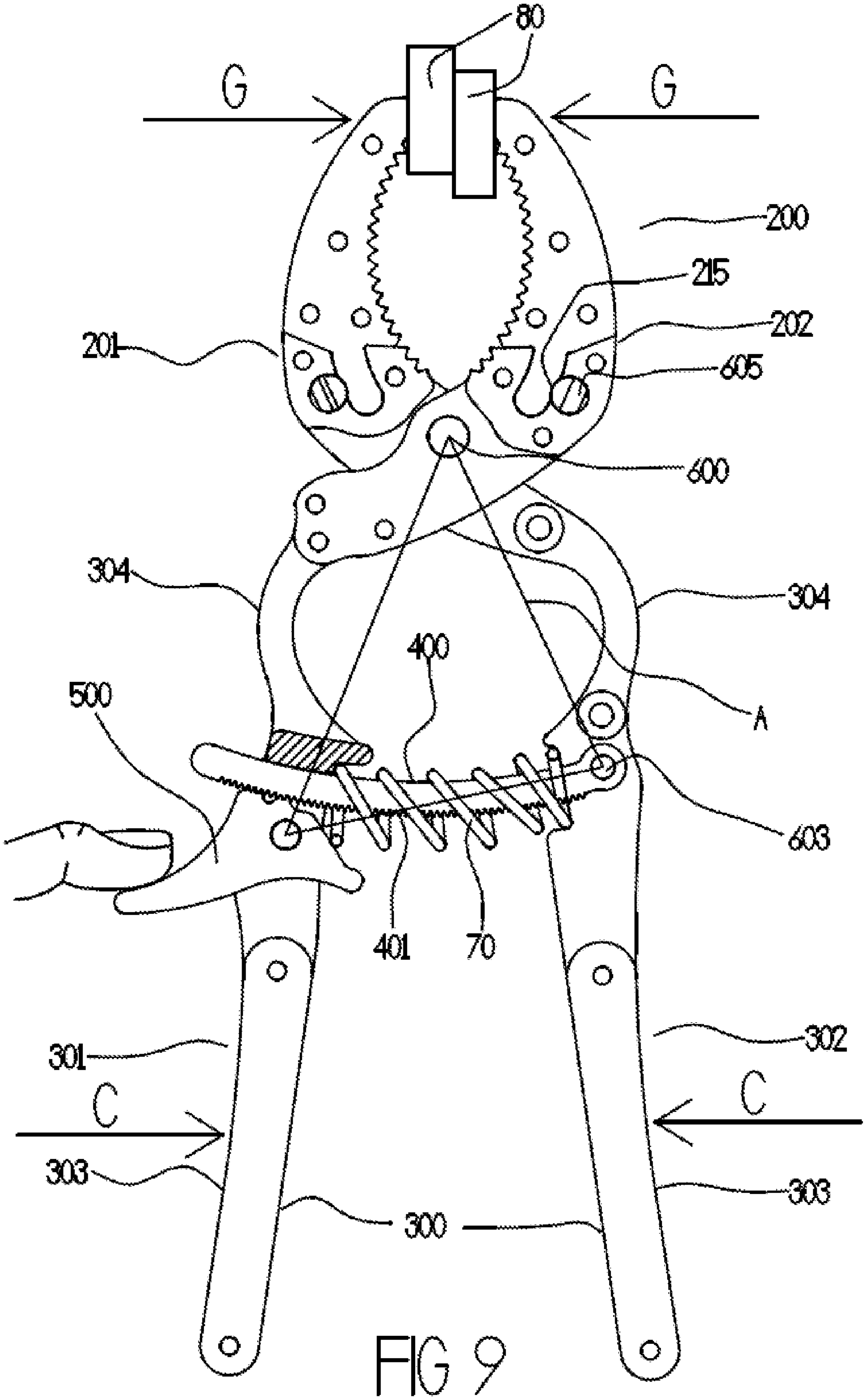
FIG. 9 is a front plan view of the Multi Jaw Pliers clamped on a workpiece, the switch operated.

FIG. 9 shows the said Pliers 1 comprising said head portion 200, said first jaw 201, said second jaw 202, said interlocking tongue recess 215, said handle portion 300, said first handle 301, said second handle 302, said handle clenching grips 303, said handle bend promoting portions 304, said pivotal strut 400, said strut toothed face 401, said pivotal switch 500, said jaw pivot pin 600, said strut axle pin 603, said jaw locking pin 605, said strut spring 70, said workpiece 80, said clenching force C, said gripping force G.

Figure 10:
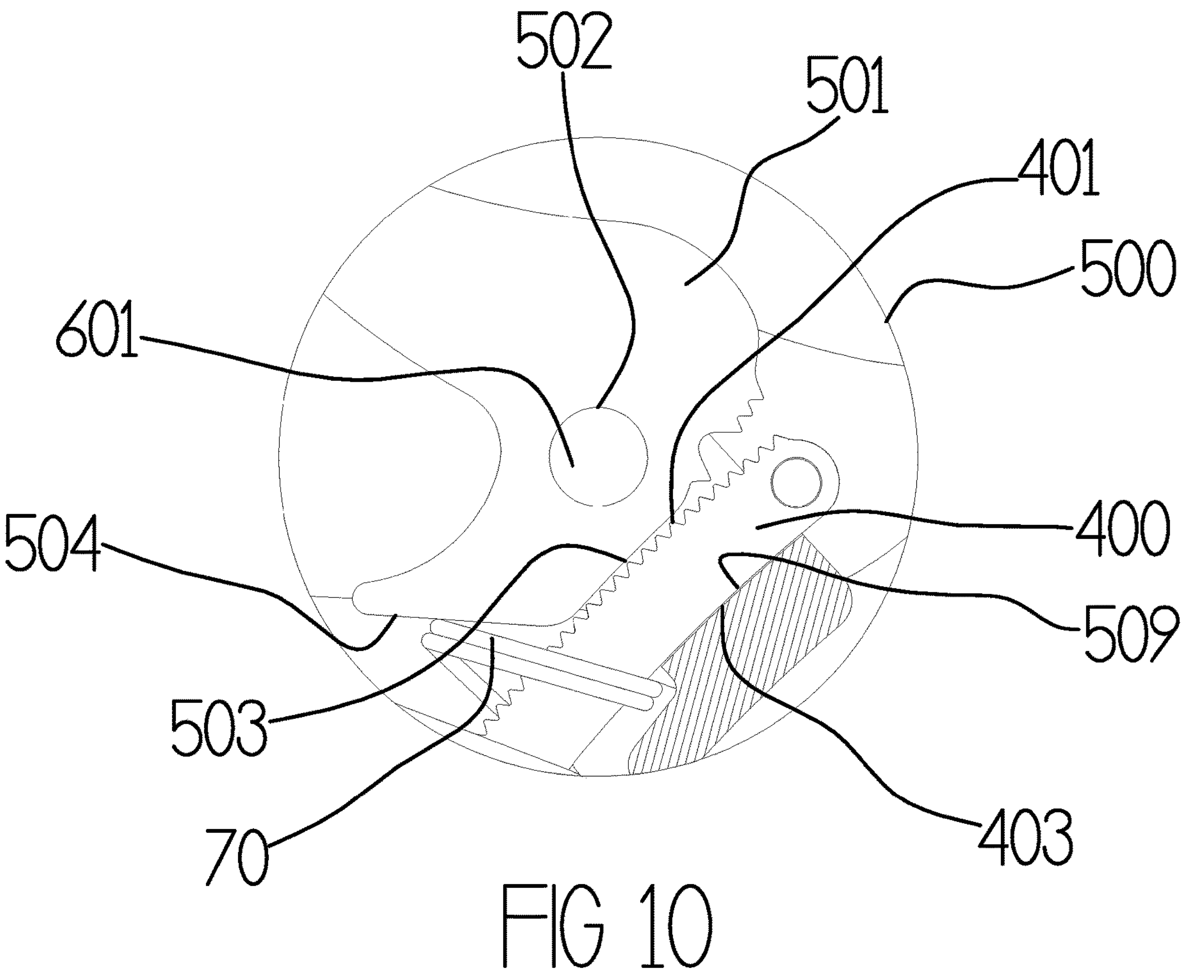
FIG. 10 is a close up plan view of the pivotal switch in the operated open position.

FIG. 10 illustrates the said pivotal switch 500 comprising said pivotal strut 400, said strut toothed face 401, said strut back face 403, said pivotal switch 500, said pivotal actuator 501, said actuator pivot hole 502, said smooth guide portion 503, said housing guide block face 509, said switch pivot pin 601.

Figure 11:
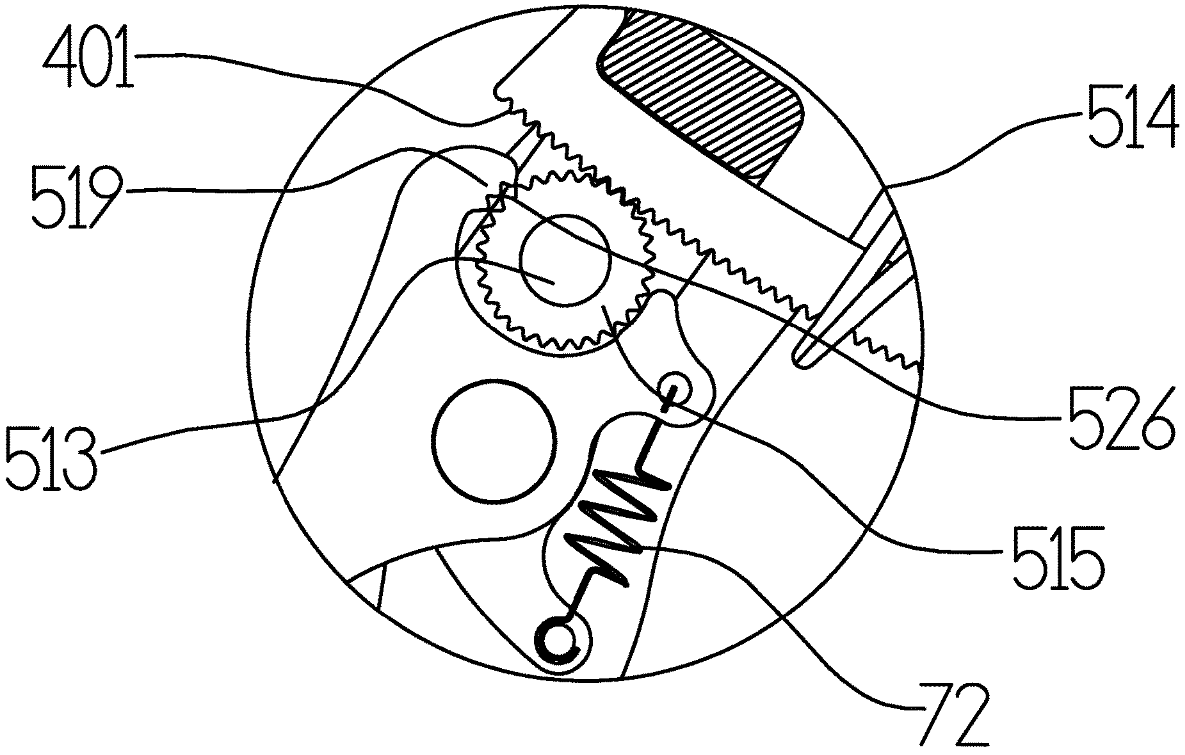
FIG. 11 is a close-up plan view of the toothed wheel switch being released.

FIG. 11 shows the said toothed wheel switch 514 comprising said strut toothed face 401, said toothed wheel 515, said positional arc locking teeth 519, said toothed wheel axle 526, switch spring 72.

Figure 12:
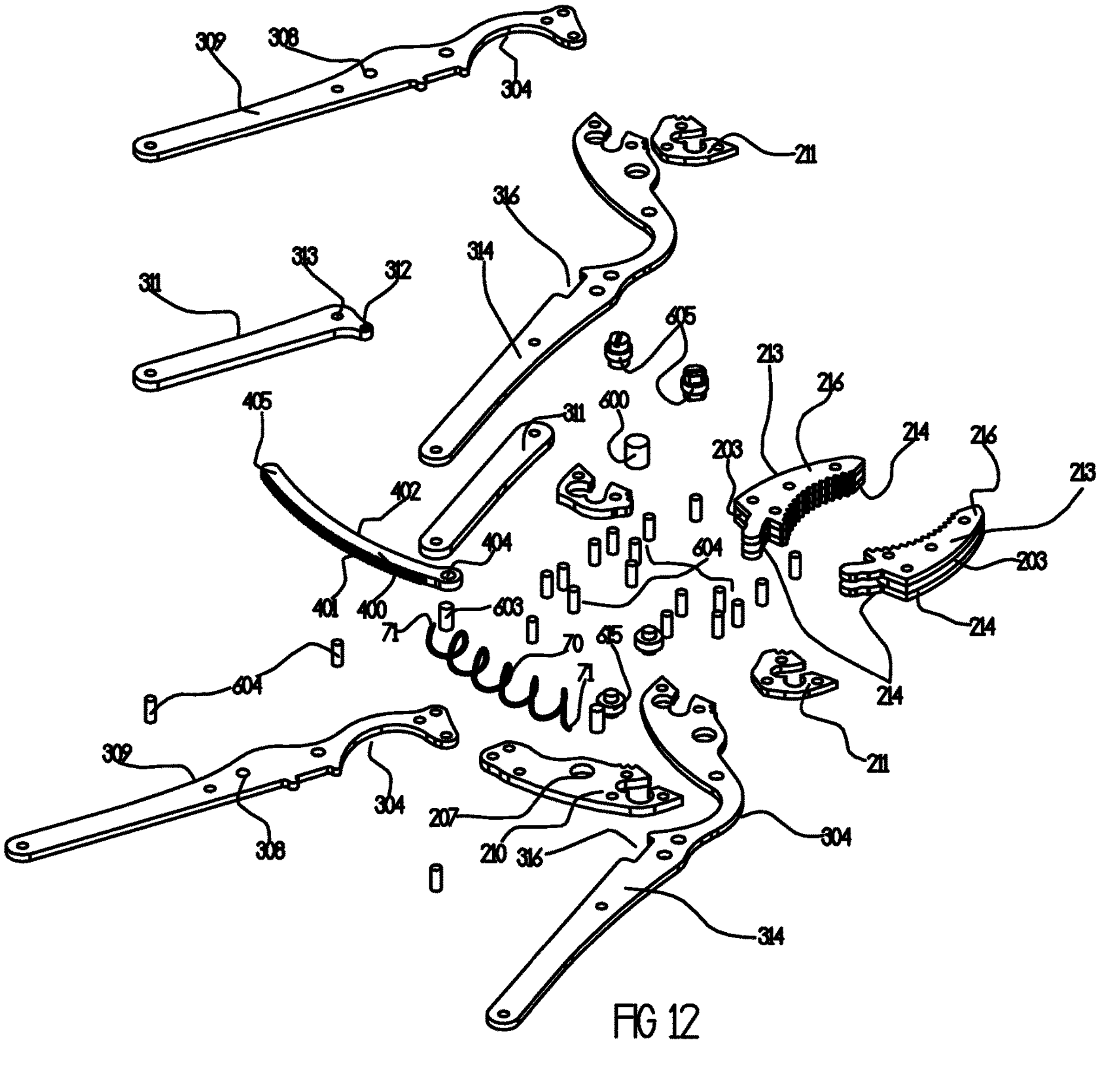
FIG. 12 is a perspective view of the Multi Jaw Pliers dismantled into its constituent parts.

FIG. 12 illustrates the said Pliers 1 dismantled for display purposes comprising said gripping face 203, said jaw pivot bore 207, said second lower inner plate 210, said second lower outer plate 211, said detachable jaw 213, said interlocking tongue 214, said detachable jaw abutment faces 216, said handle bend promoting portions 304, said switch pivot pin holes 308, said first handle outer plates 309, said first handle inner plates 311, said grip covers 313, said second handle outer plates 314, said strut spring face 316, said pivotal strut 400, said strut toothed face 401, said strut teeth 402, said strut pivot pin hole 404, said strut outer end 405, said housing guide block face 509, said jaw pivot pin 600, said strut axle pin 603, said fixings 604, said jaw locking pin 605, said spacers 615, said strut spring 70, said strut spring ends 71.

Figure 13:
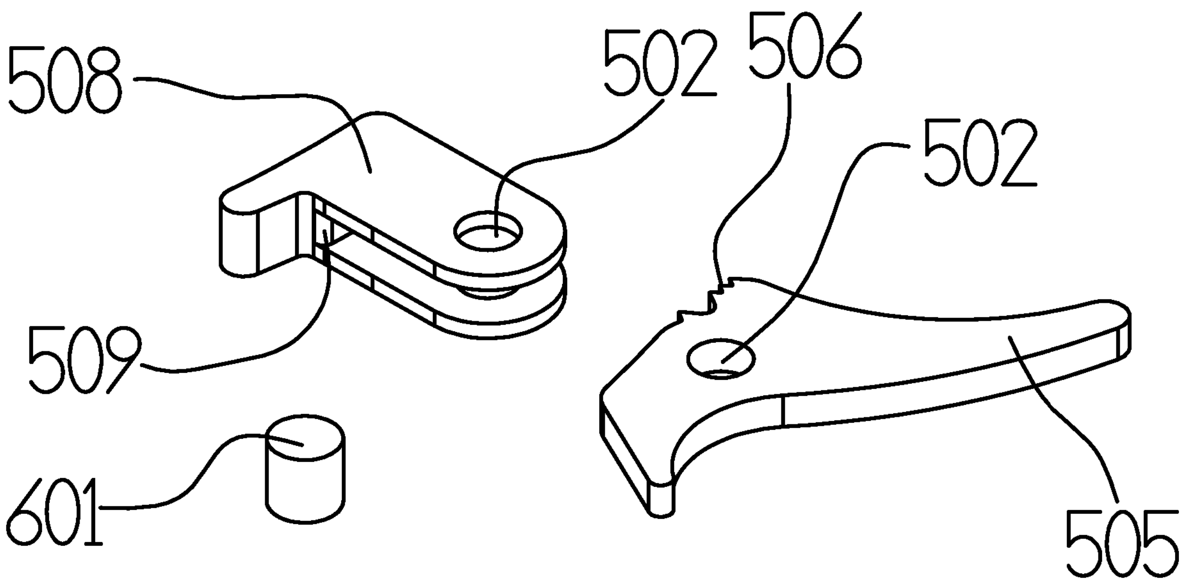
FIG. 13 is a perspective view of the pivotal switch dismantled into its constituent parts.

FIG. 13 shows the said dismantled for display purposes said pivotal switch 500 comprising said actuator pivot hole 502, said toggle lever 505, said housing guide block face 509, said toothed wheel axle 516, said positional arc locking teeth 519, said toothed wheel switch housing 522.

Figure 14:
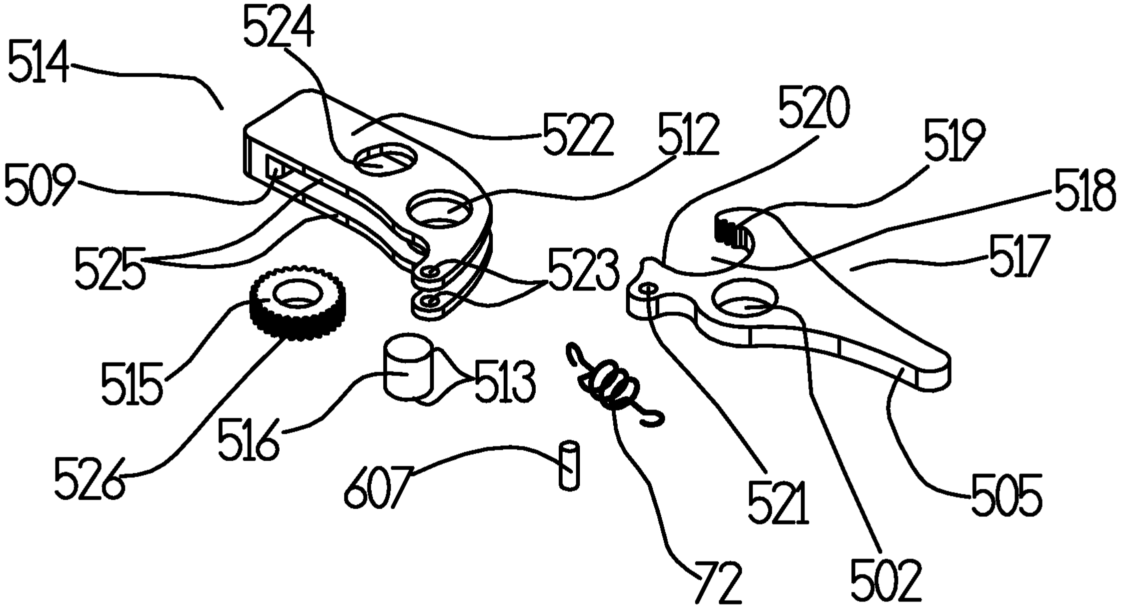
FIG. 14 is a perspective view of the toothed wheel switch dismantled into its constituent parts.

FIG. 14 illustrates the said dismantled for display purposes said toothed wheel switch 514 comprising said actuator pivot hole 502, said toggle lever 505, said housing guide block face 509, said toothed wheel switch 514, said toothed wheel 515, said toothed wheel axle 516, said actuator 517, said actuator positional arc 518, said positional arc locking teeth 519, said positional arc unlocking surface 520, said actuator spring hole 521, said toothed wheel switch housing 522, said toothed wheel switch housing spring hole 523, said toothed wheel switch housing engagement slots 524, said toothed wheel 525, said toothed wheel axle 526, said locking pin outer axle 607, said switch spring 72.

Figure 15:
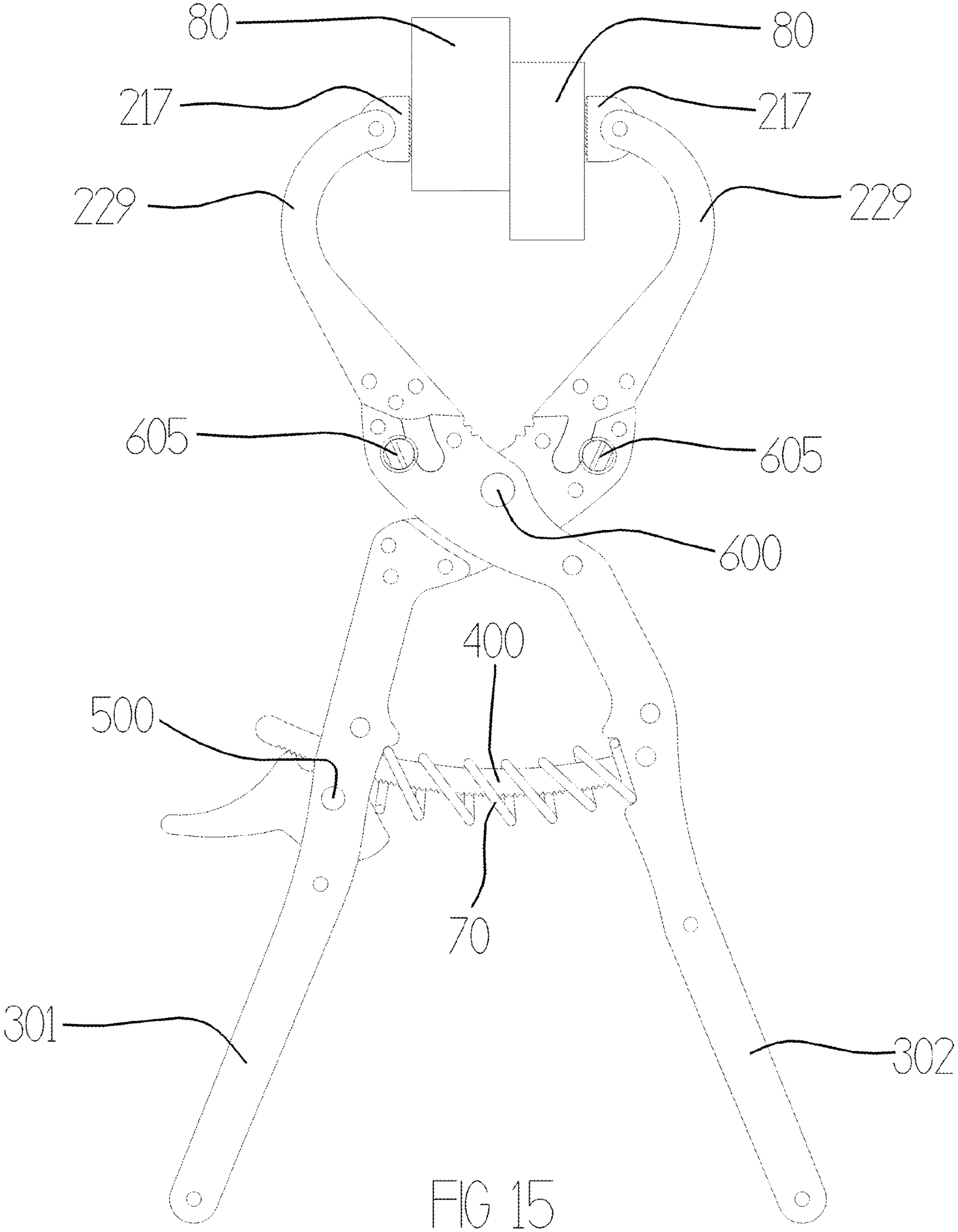
FIG. 15 is a front plan view of a further example of the Multi Jaw Pliers clamped on a workpiece.

FIG. 15 denotes the said Pliers 1 comprising said detachable jaw swivable gripping portion 217, said detachable jaw bend promoting portions 229, said first handle 301, said second handle 302, said pivotal strut 400, said pivotal switch 500, said jaw pivot pin 600, said jaw locking pin 605, said strut spring 70, said workpiece 80.

Figure 16:
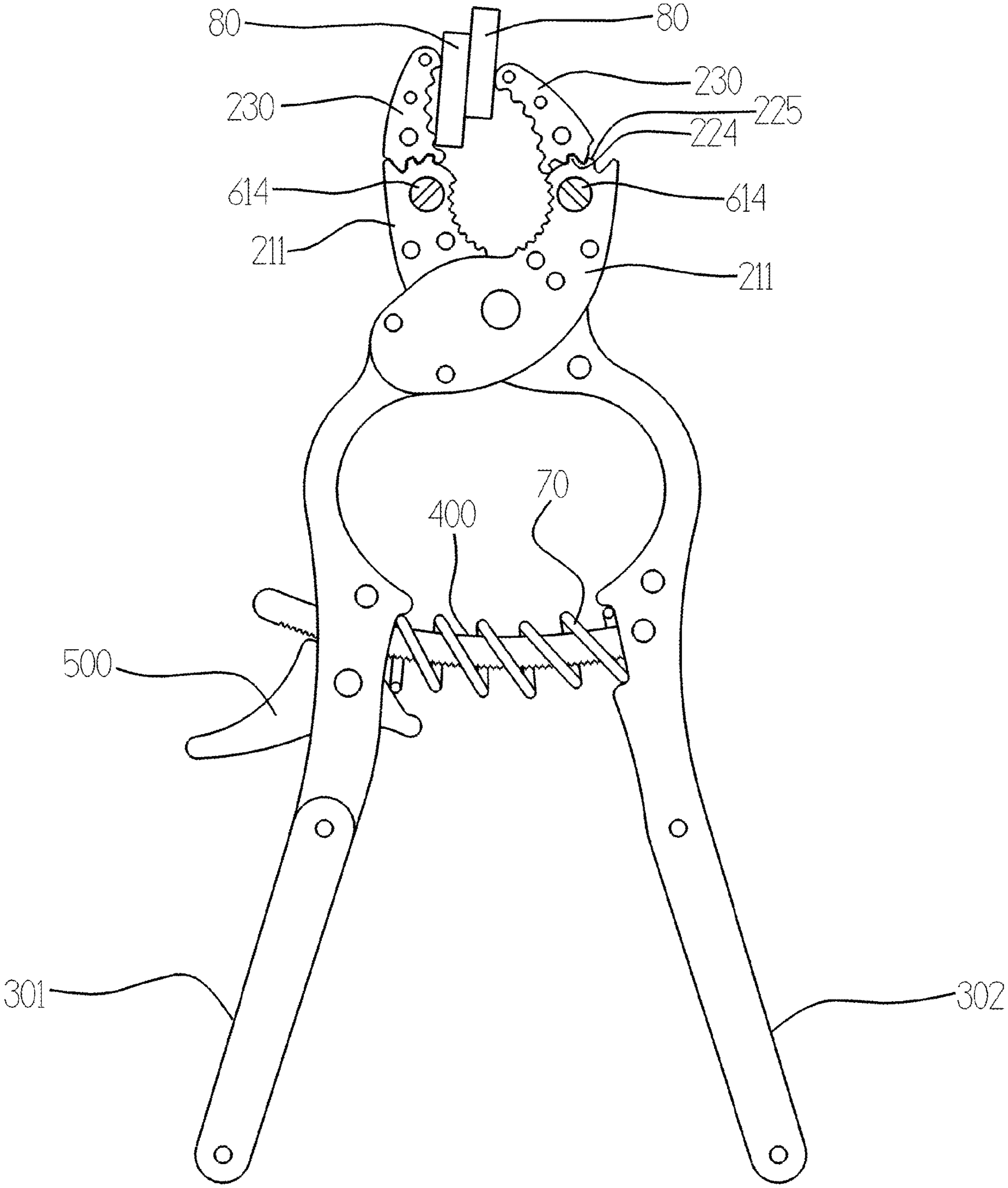
FIG. 16 is a front plan view of an even further example of the Multi Jaw Pliers clamped on a workpiece.

FIG. 16 illustrates the said Pliers 1 comprising said interlocking tongue recess 215, said detachable jaw engagement teeth 224, said first handle 301, said second handle 302, said pivotal strut 400, said pivotal switch 500 said, jaw locking screw 614, said strut spring 70, said workpiece 80.

Figure 17:
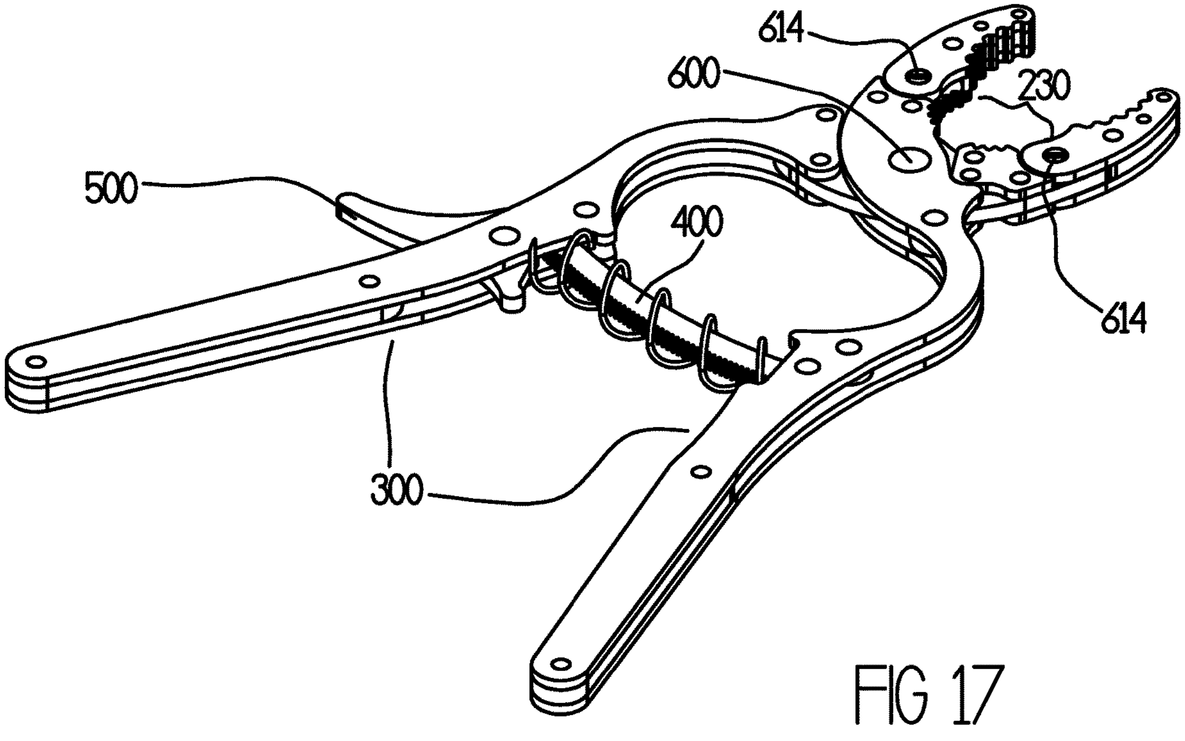
FIG. 17 is a perspective view of the even further example of the Multi Jaw Pliers in the open relaxed position.

FIG. 17 shows the said Pliers 1 comprising said head portion 200, said handle portion 300, said pivotal strut 400, said pivotal switch 500, said jaw pivot pin 600, said jaw locking screw 614.

Figure 18:
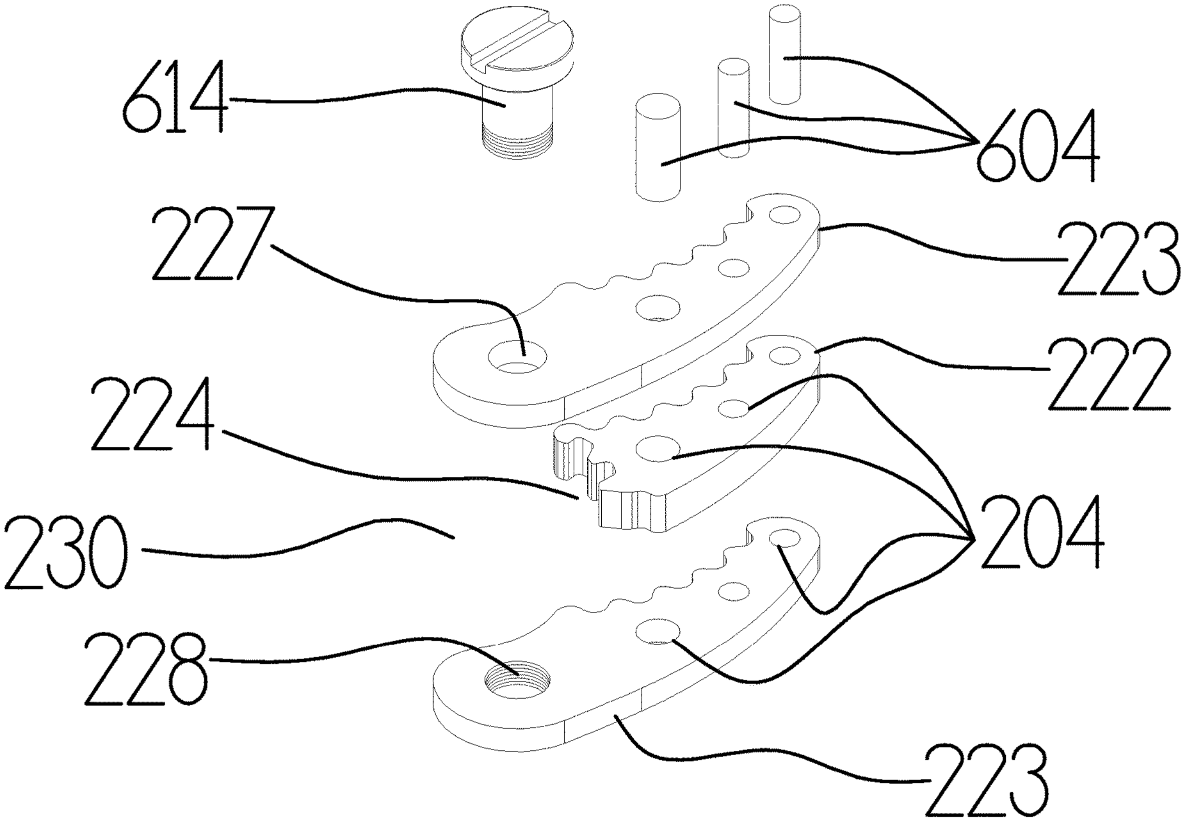
FIG. 18 is a perspective view of the swivel lock detachable jaw dismantled into its constituent parts.

FIG. 18 illustrates the said detachable jaw 213 comprising said assembly holes 204, said detachable jaw engagement teeth 224, said detachable jaw screw hole 227, said detachable jaw locking threaded hole 228, said fixings 604, said jaw locking screw 614.

FIG. 1 illustrates the first embodiment of the present invention, a set of multi jaw pliers 1, the pliers 1 are at rest. Although many differing types of detachable jaw 213 attachment could be utilised the example shown is the preferred method.

The head portion 200, having detachable jaws 213 of various shapes and sizes according to the operator's requirements, the drawings showing but a few variations.

The detachable jaws 213 with their gripping faces 203 having interlocking tongues 214 engaged within the lower jaws 208, 209 detachable jaw recesses 221, and locked in position by the jaw locking pin 605 engaged within the interlocking tongue recess 215.

The handle portion 300 comprises a first handle 301 and second handle 302 with clenching portions 303 pivotal around the jaw pivot pin 600. The said handles 301, 302 contiguous to their corresponding lower jaw elements 208, 209. The handles 301, 302 with their corresponding jaws 201, 202 pivotal around the jaw pivot pin 600.

FIGS. 2, 3 illustrate the first embodiment of the present invention, a set of multi jaw pliers 1 showing an example of the detachable jaw 213. FIG. 2 illustrates a one piece forged/machined, cast or Metal Injection Moulded or other manufactured example of the detachable jaw 213. It is obvious that the one piece detachable jaw 213 could be also for example plastic injection moulded for use on easily marked workpieces 80 (not shown). The detachable jaw 213, comprising a gripping face 203, abutment faces 216, interlocking tongues 214, interlocking tongue recesses 215 and lower jaw web aperture 218. Further shown is the jaw locking pin 605, comprising a locking face 609, unlocking face 610, control axle 606 and operating slot 608.

FIG. 3 shows a further example of construction of the said detachable jaw 213 wherein the metal layers can be stamped or fine blanked to form a laminate like construction, using rivets or the like as fixings 604 through the jaw assembly holes 219. Comprising a gripping face 203, abutment faces 216, inter-locking tongues 214 with inter-locking tongue recesses 215. Further shown is the jaw locking pin 605 comprising a central axle 606, outer axle 607, locking face 609, unlocking face 610, outer face 611 with an operating slot 608 or alternately a threaded bore 612 for the use with corresponding screws 613 which when locked within the said threaded bore 612 can usefully be used for the appropriate rotation of the said locking pin 605. Although many differing types of detachable jaw 213 attachment could be utilised the laminated example shown is the simplest and most cost effective, comprising of outer plates 223 and inner plate 222.

FIG. 4 further illustrates the first embodiment of the present invention, detachable jaws 213 with their gripping faces 203 having interlocking tongues 214 for engagement within the lower jaws 208, 209 engagement slots 212, and locked in position by the jaw locking pin 605 engaged within the corresponding interlocking tongue recess 215. The said locking pin 605 shown in this illustration with an operating slot 608 the unlocking faces 610 illustrated aligned with the engagement slots 212 inner profile thereby allowing the said detachable jaw 213 interlocking tongue 214 to be inserted or removed as required into the appropriate engagement slots 212 within the said lower jaws 208, 209. When the appropriate said detachable jaw 213 is incorporated within the chosen lower jaw 208 or 209 its abutment faces 216 will robustly adjoin similarly profiled lower jaw abutment faces 220 and lower jaw outer plates 211 in best practice the lower jaws engagement slots 212 further comprise a lower jaw web 218 which usefully strengthens the attachment construction. It is obvious that the interlocking tongue 214 etc. can be alternately affixed the lower jaws 208, 209 and the lower jaw engagement slots 212 be within the detachable jaws 213 yet the construction still be within the scope of the present invention.

FIG. 5 illustrates the second embodiment of the present invention a set of multi jaw pliers 1, comprising a said pivotal strut 400 encompassed by a said strut spring 70, showing the head portion 200, handle portion 300 and the locking strut 400 with a corresponding pivotal switch 500. The second embodiment illustrating a method whereby the jaw 201, 202 closure can be usefully enhanced by the incorporation of the locking strut 400 and corresponding switch 500 for locking the handles 301, 302 in the operated closed position, the operation of the switch 500 releasing the strut 400 locking function the strong strut spring propelling the handles into their open position. As an added safety feature the handles 301, 302 require to be first compressed to release the tension between the strut toothed face 401 and the switch toothed engagement 504 (not shown) before the switch 500 can disengage the locking teeth 401. The handles 301, 302 are usefully biased towards the open position by the strut spring 70.

Though a non-essential integer the most cost effective method of manufacture and assembly of the majority of the said pliers 1 construction is as illustrated a laminate like composition made from cut or stamped generally planar metal plate 210, 211, 222, 223, 309, 311, 314, affixed as required by suitable fixings 604 through assembly holes 204, 219, 306 to the adjoining layers of plate. The $1^{st}$ handle 301 comprising of outer plates 309 and inner plate 311, the $2^{nd}$ handle 302 comprising of outer plates 314 and inner plate 311. The first and second jaws 201,202 comprising in the example shown of a first jaw 201 outer lower jaw 208 contiguous with the second handle outer plates 314.

FIGS. 6 and 9 in particular illustrate the third embodiment of the present invention a set of multi jaw pliers 1, the third embodiment illustrates the incorporation of dual bowed bend promoting portions 304 into the handle portion 300 showing the head portion 200, handle portion 300 and a further pivotal link 400 with a corresponding locking switch 500. The second embodiment illustrating a method whereby the jaw 201,202 closure can be usefully enhanced by the incorporation of the sprung pivotal link 400 and corresponding switch 500 for locking the handles 301, 302 in the operated closed position, the operation of the switch 500 releasing the strut 400 locking function. As an added safety feature as shown in FIG. 9 the handles 301, 302 require to be first compressed to release the tension between the link toothed face 401 and the switch toothed engagement 504 (not shown) before the switch 500 can disengage the pivotal link teeth 401. The handles 301, 302 are usefully biased towards the open position by the link spring 70 and the pivotal switch 511 or swivel lock 500 is further usefully biased by the switch spring 72 or link spring 70.

As illustrated in FIG. 6,7 in order to provide a method of adjusting the clamping pressure exerted by the jaws 201, 202 the pivotal link 400 is rotatable around its axle pin 603 when the handles 301, 302 are clenched closing the jaws 201, 202 upon the workpiece 80 etc. As the handles 301, 302 are further activated, pivoting around the pivot pin 600, the pivotal link teeth 401 "ratchet" over the corresponding teeth 506 on the pivotal actuator 501, according to the closing pressure C applied. When the operator has reached the level of gripping force G required and releases the applied grip C from the handle grips 303 the ratchet teeth 401, 504 engage in a locking manner. The flex induced within the living spring portions 304 and clamping the jaws 201, 202 upon the clamped parts 80 is retained by the pivotal link 400 retention by the pivotal actuator 501 lock teeth 506 upon the strut teeth 402. As further illustrated in FIG. 9 the retained pivotal link 400 thereby comprises the base of a triangular elastic potential energy structure A, the bend promoting portions 304 further comprising the sides of the triangle A and the jaw pivot pin 600 as the apex, this formation usefully acts via the connected jaws 201, 202 to provide clamping pressure to the said jaws 201,202 upon the workpiece 80, this gripping force G pressure being advantageously resilient in nature.

As further illustrated in FIGS. 4,8,11 and 14 the fourth embodiment is the depicted pivotal switch 514, the pivotal switch 511 has an axle 513. The pivotal link 400 comprises in this iteration a toothed face 401 and an opposite back face 402.

As shown in FIG. 4 a compression spring 70 circumscribes the said pivotal link 400 and urges when allowed the handles 301,302 apart towards an open at rest position. The switch 500 in this example a wedging arrangement comprising a toothed wheel 515 having an axle 516 confined within elongate slots 524 within the toothed handle switch housing 522, when the pliers 1 have been operated and the jaws 201, 202 are forcefully closed C thereafter the handles 301, 302 relaxed, the axle 516 is therefore propelled up the said slots 310 towards the pivotal link 400 whereas it robustly wedges the axle 516 and therefore the toothed wheel 515 against the pivotal link toothed face 401 usefully locking the jaws 201,202 in the operated closed position.

Some examples may provide a more immediate locking action with minimal loss of elastic potential energy during the switching process, wherein the toothed wheel switch 514 is provided having an internal positional arc 517 encompassing a corresponding inner toothed wheel 515 with a central axle 516, the arc 514 having an inner smooth unlocking surface 520 and an opposite toothed inner locking surface 519. The toothed wheel 515 is able to traverse within the limitations of its retention of its axles 516 within the switch elongate slots 525. The toothed wheel 515 being optimally kept in constant sprung engagement with the corresponding teeth 402 of the pivotal link 400 by the switch housing guide block face 509 projecting the toothed wheel 515 up the angled elongate slots 524 towards the link teeth 402. The axle 516 in best practice is robustly attached to the toothed wheel 515 although it is not a requirement. The axle 516 and its attached toothed wheel 515 during the actuation of the handles 301, 302 sequence can freely rotate within the switch 514 internal arc 518 and restricted confines of the elongate slots 524 within the corresponding toothed wheel switch housing 522, as the toothed wheel 515 is in the jaw 201,202 closure sequence rotated anti clockwise down the elongate slots 524 by its interaction with the toothed strut 400. The elongate slots 524 are set at an appropriate angle relative to the strut toothed face 401 such that, as the handles 301, 302 are compressed the toothed wheel 515 and its axle 516 rotate anti clockwise down the elongate slots 524 away from any locking action upon the strut toothed face 401. When the handle portions 301, 302 gripping force is released the bowed portions 304 elastic potential energy causes the toothed strut 400 to rotate the engaged toothed wheel 515 and axle 516 clockwise up the angled elongate slots 524 towards the toothed strut 400, until it is robustly wedged by the converging elongate slot 524 angles upon the corresponding toothed strut 400, locking the handles 301, 302 and thereby jaws 201, 202 closed upon the clamped workpiece 80 in a usefully robust sprung gripping action. In order to unlock the jaws 201,202, the toothed wheel's 515 axle's 516 locked position within the elongate slots 524 can be usefully transmuted by the operation of the pivotal switch 514 having an integral arc unlocking surface 516 designed to act upon the periphery of the toothed wheel 515 yet not impede its rotation. As shown in FIGS. 8, 11 the operation of the toggle lever 505 pivoting the switch 514 around its switch pivot pin 601 bringing the smooth unlocking surface 520 of the integral arc 518 forcefully into contact with the toothed wheel 515 periphery in the release direction, as an inbuilt safety lock measure the handles 301, 302 must first be operated enough to relieve the locking force of the toothed wheel axle 516 within the elongate slots 524 upon the toothed strut 400, the simultaneous operation of the switch actuator 505 allowing a smooth unlocking action as the handle 301, 302 pressure C and therefor jaw 201, 202 clamping pressure is further relieved.

FIGS. 7, 9, 10 illustrate the lock/unlock positions of the fifth embodiment of the present invention a set of multi jaw pliers 1, incorporating a cost-effective swivel lock 500 whereas the mechanism can be set to allow the handles 301, 302 to either move freely relative to one another when utilised or be conveniently locked in their last operated position.

For demonstration purposes the handle outer top plate 309 is removed to show the workings of the inner switch 500.

FIG. 9 shows the pliers 1, illustrating the switch 500 in the locking position, with workpieces 80 clamped between the jaws, whereas the switch 500 urged by the strut spring 70 acting against the spring operating face 504 resiliently rotating around the switch pivot pin 601 till the switch teeth 506 engage the corresponding pivotal strut teeth 402 usefully locking the said strut 400 between swivel lock 500 and the opposing guide block face 509. The switch locking stop 507 which also comes into contact with the toothed strut face 401, can be either smooth or similarly toothed to the strut toothed face 401, the said stop 507 preventing unwanted switch 500 travel after the locking has taken place.

FIGS. 9 and 10 further show the pliers 1, illustrating the switch 500 in the locked/unlocked position, the actuator 501 depressed swivelling the said switch 500 substantially smooth guide portion 503 into contact with the pivotal strut toothed face 401 allowing the pivotal strut 400 to move freely under the resilient pressure of the strut spring 70 till the pliers 1 are in their open position.

FIG. 15 illustrates the present invention whereas the resilient bend promoting portion 229 is incorporated within the detachable jaws 213.

FIG. 16 even further shows the pliers 1, illustrating the switch 500 in the locking position, with workpieces 80 clamped between the jaws.

FIGS. 16, 17 and 18 further illustrate the sixth embodiment of the present invention 1, said jaws 230 that are capable of being usefully rotated into differing toothed positions or angles and thereafter robustly locked in the required position or further removed and replaced with the requisite shaped jaw 230 for the job application. Comprising detachable jaws or jaws 230 having outer plates 223 with a shorter inner plate 222 configured to form a recess 221 between the outer plates 223 into which can be retained the corresponding lower jaw inner plate 210. The detachable jaw inner plates 222 having toothed castellation's or engagement teeth 224 which when incorporated into the correspondingly profiled lower jaw engagement teeth 225 form a robust jaw structure 201, 202, the jaw locking screw 614 when operated clamping the outer plates 223 upon the lower jaw inner plate 210 further adding to the overall integrity of the jaw 201, 202. The detachable outer jaw plates 223 having a through hole in one and a screw hole in the other, the lower jaw inner plate 210 having in best practice an appropriately shaped hole to allow the jaw locking screw 614 to be slackened allowing the detachable jaw 213 to be partially withdrawn and reinserted into different jaw engagement teeth 224, 225, usefully altering as required the angle of detachable jaw 213 relative to the lower jaw 208, 209. It is best practice to have the screw holes in the detachable part 213 of the jaws 201, 202 as if screw thread 228 wear occurs it ensues in the least expensive part.

FIG. 7 further shows the pliers 1, illustrating the further example of the swivel lock switch 500 in the locked position, the strut spring end 71 acting against the spring operating face 505 rotating the said switch 500 around the switch pivot pin 601 meshing the switch teeth 504 with the strut teeth 402 in a locking manner. During the closure of the jaws 201, 202 the strut teeth 402 in contact with the switch teeth urge the swivel lock switch 500 out of toothed 504, 402 engagement rotating the said switch 500 against the resilience of the strut spring 700 in a ratchet like manner.

In some examples a set of pliers comprises a head portion incorporating gripping faces within the opposing jaws for the clamping of the desired workpiece, pivotal handle portions and a toothed strut positioned between the handles. Bow shaped resilient portion or portions can be usefully incorporated within either or both the jaw or handle portions, when the pliers are operated these resilient portions impart a useful sprung pressure upon the clamped workpiece by the gripping face of the jaws. The jaws can be usefully locked in the required clamping position upon the workpiece, in one example by a toothed strut pivotally attached to one handle and conveniently being locked or unlocked according to the switch operation on the opposing handle.

In some examples a set of pliers comprises a head portion incorporating gripping faces within the opposing jaws for the clamping of the desired workpiece, pivotal handle portions and a sprung toothed link positioned between the handles. Bow shaped resilient portion or portions can be usefully incorporated within either or both the jaw or handle portions, when the pliers are operated these resilient portions impart a useful superior sprung pressure upon the clamped workpiece by the gripping face of the jaws. The Jaws and bend promoting portion are contiguous with each individual handle and gripping portion. The jaws can further be usefully locked in the required clamping position upon the workpiece by a toothed strut pivotally attached to the fixed handle and conveniently being locked or unlocked according to the locking switch pivotal within the opposing moving handle.

Some examples may further comprise clamping widths within its specification that are automatically adjusted, the locking pressure can be further be usefully determined by the operator by the straightforward gripping pressure of the handles, the simple release of the handles initiating the locking of the jaws upon the clamped parts.

Some examples may further comprise a plurality of bowed resilient portions within either or both handles providing superior constant jaw clamping pressure of the part or parts clamped whilst normally preventing surface damage to the parts clamped. The present invention further works on a reasonable range of workpiece sizes and shapes whilst utilizing superior sprung gripping force of the workpiece. Furthermore, the main parts are capable of being stamped in order to further reduce their manufacturing cost.

Some examples may include a compression spring encompassing the pivotal link, this spring conveniently propels the handles towards their open position when the switch is unlocked and the handles are relaxed. The strong spring further largely prevents lateral movement of the moving handle down the pivotal strut during the initial clenching of the handle, ensuring that the moving handle can usefully pivot around the switch pivot in the first instance until the converging jaws both contact the workpiece. This spring can be further usefully utilized to operate the switch.

Some examples may include a pivotal switch whereas the guide block which is required to remain substantially opposite the switch teeth is incorporated within a pivotal switch housing instead of being typically statically affixed to the handle outer plates.

Some examples may include a swivel lock or actuator situated within the switch housing, the swivel lock comprising a toggle lever, a toothed engagement portion, a pivot bore, a spring abutment face, smooth guide portion and a spring stop portion.

The housing and its internal pivotal switch both rotate according to the operated movement and angle of the toothed strut. The pivotal switch pivoting as required around the switch pivot pin ensuring the cage switch remains in complete engagement and alignment with the corresponding toothed strut at all times, thereby ensuring positive engagement between the teeth of the toothed strut and the teeth of the switch. The rotation of the switch with the toothed strut therefore being capable of compensating for the obscure changes in angles as one handle pivots relative to the other and as the handle bend promoting portions flex as differing pressures are applied to the handles during use, any normal locking switch being rendered suspect as the angle of the strut teeth to the switch teeth and the guide block change as the handles pivot and flex which can and does prevent the teeth interlocking sufficiently to provide a dependable locking mechanism.

The housing integral smooth guide block guide face providing sufficient span against the opposing smooth surface of the strut back face to ensure the adjoining surfaces remain substantially parallel in all situations.

When the plier grips are operated, the handles are propelled towards one another, the strut being pivotal at the fixed end around its pivot pin. The strut locking teeth semi-engaging the swivel lock toothed engagement portion, this engagement of the switch teeth and the corresponding toothed strut further rotating the swivel lock and its corresponding teeth out of engagement with the strut engagement teeth in a ratchet like manner, against the resilience of the strut spring, the generally smooth back face of the toothed strut being robustly positioned opposite the switch teeth by the switch cage guide block. When the required gripping pressure is attained and the handle clenching grip pressure is relaxed, the resiliently bowed portions move towards their initial pre-stressed position whereby the swivel lock is rotated within the cage housing by the switch teeth engagement with the strut teeth aided by the corresponding strut spring. This action expediently engages the locking interaction between the strut teeth and the switch teeth, the locking stop whether smooth or toothed preventing undue travel. The clamping action of the jaws being determined by the remaining resilience of the bowed portions, the elastic potential energy. The resultant jaw resilient closing force is largely proportional to the force applied to the handles and the pivotal dimension ratio between the handles and jaws less any small losses incurred during the switch locking procedure, the pivot being the jaw fulcrum pin.

Some examples may include a more immediate locking action cage switch incurring minimal loss of elastic potential energy during the switching process, comprising a switch housing with parallel outer laminates through which are situated the pivot pin holes, the inner recess or strut channel incorporating the guide block and the outer face incorporating a strut spring guide. The strut channel containing a pivotal actuator having an internal arc encompassing a corresponding inner toothed wheel with a central axle, the arc having an inner smooth unlocking surface and an opposite toothed inner locking surface, the actuator pivotally operated by a toggle lever around the switch pivot pin. The toothed wheel is able to traverse within the limitations of the retention of its axles within the switch cage elongate slots. The toothed wheel being optimally kept in constant sprung engagement with the corresponding teeth of the locking strut by the switch inner (toothed or smooth) locking surface, projecting the toothed wheel up the angled elongate slots towards the strut teeth. The axle in best practice is robustly attached to the toothed wheel although it is not a requirement. The axle and its attached toothed wheel during the actuation of the handles sequence can freely rotate against the ratchet like action of the sprung toothed locking surface within the switch internal arc and restricted confines of the elongate slots within the corresponding cage housing laminates. The elongate slots are set at an appropriate angle relative to the locking strut teeth such that, as the handles are compressed in the final clenching sequence the toothed wheel and its axle in one example rotate anti clockwise up the elongate slots away from any locking action upon the toothed strut. When the handle portions gripping force is released the bowed portions elastic potential energy causes the toothed strut to rotate the partially pre-engaged toothed wheel clockwise down the angled elongate slot within the cage housing outer laminates, towards the toothed strut teeth, until it is robustly wedged by the converging elongate slot angles upon the corresponding toothed strut, locking the handles and thereby jaws closed upon the clamped workpiece in a usefully robust sprung gripping action. In order to unlock the jaws the toothed wheels locked position within the elongate slot can be usefully transmuted by the operation of the pivotal actuator toggle lever, the pivotal actuator having an integral arc unlocking surface designed to act upon the periphery of the toothed wheel yet not impede its rotation. The operation of the toggle lever pivoting the pivotal actuator around its switch pivot pin bringing the smooth unlocking surface of the positional arc forcefully into contact with the toothed wheel periphery in the release direction, as an inbuilt safety lock measure the handles must first be operated enough to relieve the locking force of the toothed wheel axle within the elongate slots upon the toothed strut, the simultaneous operation of the toggle lever allowing a smooth unlocking action as the handle pressure and therefor jaw clamping pressure is further relieved.

As it is commercially prudent to have a clicking noise to accompany the jaw closure and locking procedure the pivotal actuator inner locking surface can be further toothed, the interaction of the tooth or teeth with the corresponding rotating toothed wheel providing a typical ratchet like sound, the switch rotating as required around the switch pivot pin against the resilience of the strut spring.

In a further iteration in order to provide a more versatile and useful device, the jaw working profiles or outer jaw can be interchanged with other outer jaws with differing working profiles in order to provide a cost-effective equivalent to several set of differing pliers required for different jobs. These interchangeable jaws being usefully locked or unlocked from robust engagement within the lower jaws as required, providing one locking handle set capable of use with a cost-effective range of differing jaws as required.

In one example the lower jaws comprising of a laminate like construction in order to provide a lower cost method of retaining the locking swivel pin which comprises a central axle rotatable within a corresponding thickness and bore within the lower jaw inner plate. The locking swivel pin having a further reduced circumference hereafter termed outer axles, largely level in height to the lower jaw outer plates which have corresponding circular cut out profiles such that the said swivel pin is laterally held within the lower jaw by the outer plates whilst capable of rotation within its afforded enclave. The outer end face of the locking swivel pin can usefully incorporate a screwdriver slot or other drive profile for the required rotation of the said pin, one further alternative being the use of known large head screws screwed into corresponding threads within the said swivel pin, the screw heads adding to the integrity of the outer and inner jaw structure, the screws usefully locked in the correct tolerance position by know locking fluid. The locking swivel pin outer axles comprising a spherical locking face and a generally flat unlocking face, the spherical locking face can be further appropriately cam shaped in order to increase the locking mechanism proficiency. The locking swivel pin is located partially within the lower jaw interlocking tongue recess, by rotating the locking swivel pin the profile of the locking swivel pin outer axle can be chosen to either present a locking or unlocking face into the tongue recess.

The detachable outer jaws having corresponding locking tongues incorporated within their generally planar outer plates, in best practice the tongues are formed in a slow curve to aid their robust engagement within the matching tongue recesses. When the chosen outer jaw tongues are fully inserted within their lower jaw recesses, the lower jaw abutment faces further robustly contact the outer jaw abutment faces. The tongues having suitably positioned indentations for the engagement of the outer axle locking faces when the locking swivel pin is appropriately utilized, conversely the locking swivel pins can be suitable rotated wherein the unlocking faces of the said swivel pins are substantially in line with the profile of the jaw interlocking tongue recess in order to provide straightforward engagement or withdrawal of the chosen outer jaw from the lower jaw.

Thus, although there have been described particular embodiments of the present invention of a new and useful Hand Operated Gripping Tools it is not intended that such references be construed as limitations upon the scope of this invention except as set forth in the following claims.

What is claimed is:

1. A hand operated gripping tool comprising:

a first handle;

a first jaw connected with said first handle;

a second handle; and a second jaw connected with said second handle;

wherein said second handle is pivotably connected with said first handle to permit relative pivoting movement of said first and second handles, wherein one of said first jaw and second jaw is a removable jaw and said removable jaw is push-fit attachable to the respective said handle, wherein said removable jaw comprises an outboard portion that projects from the respective said handle and has a gripping face and an inboard portion that projects from said outboard portion and is received by the respective said handle, wherein said inboard portion comprises a first part and a second part disposed opposite said first part to define a slot between said first and second parts, the respective said handle defines respective recesses to receive said first and second parts and said recesses define a blade that complementary engages in said slot when said removable jaw is push-fit attached to said respective handle, wherein said blade comprises a leading end provided with a plurality of teeth that complementarily engage a plurality of teeth defined by said removable jaw to define a plurality of selectable orientations of said removable jaw with respect to the respective said handle.

2. A hand operated gripping tool as claimed in claim 1, further comprising a locking mechanism by which said removable jaw is lockable to the respective said handle.

3. A hand operated gripping tool as claimed in claim 1, wherein each of first and second jaws is a said removable jaw.

4. A hand operated gripping tool comprising:

a first handle;

a first jaw connected with said first handle and having a gripping face;

a second handle pivotably connected with said first handle to permit relative pivoting movement of said first and second handles; and a second jaw connected with said second handle and having a gripping face, wherein at least one of said first and second jaws is a removable jaw and said removable jaw is push-fit attachable to the respective said handle, wherein said removable jaw comprises a first part and a second part disposed opposite said first part to define a slot between said first and second parts, said respective handle defines respective recesses to receive said first and second parts and said recesses define a blade that complementary engages in said slot when said removable jaw is push-fit attached to said respective handle so that said first and second parts are received in the respective recesses, wherein said removable jaw is connected with said respective handle by a locking screw, wherein said blade comprises a leading end provided with a plurality of teeth that complementarily engage a plurality of teeth defined by said removable jaw to define a plurality of selectable orientations of said removable jaw with respect to the respective said handle by rotating said removable jaw about said locking screw.

* * * * *